US008352342B1

(12) United States Patent
Bent, II et al.

(10) Patent No.: US 8,352,342 B1
(45) Date of Patent: Jan. 8, 2013

(54) METHOD AND SYSTEM FOR DETERMINING FEES FOR DEPOSITS ALLOCATED OVER A PLURALITY OF DEPOSIT INSTITUTIONS

(75) Inventors: Bruce Bent, II, Manhasset, NY (US); David Gareis, Maplewood, NJ (US)

(73) Assignee: Island Intellectual Property LLC, Manhasset, NY (US)

( * ) Notice: Subject to any disclaimer, the term of this patent is extended or adjusted under 35 U.S.C. 154(b) by 266 days.

(21) Appl. No.: 12/816,092

(22) Filed: Jun. 15, 2010

Related U.S. Application Data

(60) Provisional application No. 61/218,810, filed on Jun. 19, 2009.

(51) Int. Cl.
*G06Q 40/00* (2012.01)
(52) U.S. Cl. ............................................. 705/35; 705/39
(58) Field of Classification Search .................... 705/35, 705/39
See application file for complete search history.

(56) References Cited

U.S. PATENT DOCUMENTS

| | | | |
|---|---|---|---|
| 4,232,367 | A | 11/1980 | Youden et al. |
| 4,346,442 | A | 8/1982 | Musmanno |
| 4,376,978 | A | 3/1983 | Musmanno |
| 4,597,046 | A | 6/1986 | Musmanno et al. |
| 4,674,044 | A | 6/1987 | Kalmus et al. |
| 4,694,397 | A | 9/1987 | Grant et al. |
| 4,700,297 | A | 10/1987 | Hagel et al. |
| 4,751,640 | A | 6/1988 | Lucas et al. |

(Continued)

FOREIGN PATENT DOCUMENTS
JP      10-049590 A     2/1998

WO      WO-95/23379 A1    8/1995

(Continued)

OTHER PUBLICATIONS

Lawsuit by *Island Intellectual Property LLC, et al. v. Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.

(Continued)

*Primary Examiner* — Jagdish Patel
*Assistant Examiner* — Sara C Hamilton
(74) *Attorney, Agent, or Firm* — Foley & Lardner LLP

(57) ABSTRACT

A method, system and program product, the method accessing, one or more electronic databases, comprising: aggregated account information for one or more FDIC-insured and interest-bearing aggregated deposit accounts held in one or more deposit institutions, in a program; and client account information; determining or having determined or accessing a fee tier from among a plurality of fee tiers for the respective client account; allocating, funds of the client accounts to one or more of the aggregated deposit accounts based on one or more criteria, wherein some of the client accounts in a plurality of different fee tiers are allocated to the same aggregated deposit account; determining or having determined a total interest amount for the respective client account for a period, based, at least in part, on interest earned by the one or more amounts, $A_{ni}$, of the respective client account held in each of the one or more aggregated deposit accounts holding funds of the respective client account; calculating or having calculated or obtaining a fee amount for the respective client account, based at least in part, on the fee tier for the respective client account; determining or having determined a client account interest so that the fee amount for the respective client account and the client account interest substantially equal the total interest amount for the respective client account; and updating the one or more databases.

11 Claims, 9 Drawing Sheets

U.S. PATENT DOCUMENTS

| | | | |
|---|---|---|---|
| 4,774,663 A | 9/1988 | Musmanno et al. | |
| 4,953,085 A | 8/1990 | Atkins | |
| 4,985,833 A | 1/1991 | Oncken | |
| 5,126,936 A | 6/1992 | Champion et al. | |
| 5,206,803 A | 4/1993 | Vitagliano et al. | |
| 5,220,501 A | 6/1993 | Lawlor et al. | |
| 5,235,507 A | 8/1993 | Sackler et al. | |
| 5,262,942 A | 11/1993 | Earle | |
| 5,270,922 A | 12/1993 | Higgins | |
| 5,291,398 A | 3/1994 | Hagan | |
| 5,297,032 A | 3/1994 | Trojan et al. | |
| 5,424,938 A | 6/1995 | Wagner et al. | |
| 5,631,828 A | 5/1997 | Hagan | |
| 5,644,727 A | 7/1997 | Atkins | |
| 5,671,363 A | 9/1997 | Cristofich et al. | |
| 5,689,650 A | 11/1997 | McClelland et al. | |
| 5,710,889 A | 1/1998 | Clark et al. | |
| 5,765,144 A | 6/1998 | Larche et al. | |
| 5,774,880 A | 6/1998 | Ginsberg | |
| 5,781,654 A | 7/1998 | Carney | |
| 5,802,499 A | 9/1998 | Sampson et al. | |
| 5,806,048 A | 9/1998 | Kiron et al. | |
| 5,806,049 A | 9/1998 | Petruzzi | |
| 5,812,987 A | 9/1998 | Luskin et al. | |
| 5,826,243 A | 10/1998 | Musmanno et al. | |
| 5,852,811 A | 12/1998 | Atkins | |
| 5,864,685 A | 1/1999 | Hagan | |
| 5,875,437 A | 2/1999 | Atkins | |
| 5,878,258 A | 3/1999 | Pizi et al. | |
| 5,878,405 A | 3/1999 | Grant et al. | |
| 5,884,285 A | 3/1999 | Atkins | |
| 5,890,141 A | 3/1999 | Carney et al. | |
| 5,893,078 A | 4/1999 | Paulson | |
| 5,903,881 A | 5/1999 | Schrader et al. | |
| 5,905,974 A | 5/1999 | Fraser et al. | |
| 5,940,809 A | 8/1999 | Musmanno et al. | |
| 5,941,996 A | 8/1999 | Smith et al. | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein et al. | |
| 6,014,642 A | 1/2000 | El-Kadi et al. | |
| 6,016,482 A | 1/2000 | Molinari et al. | |
| 6,026,438 A | 2/2000 | Piazza et al. | |
| 6,032,133 A | 2/2000 | Hilt et al. | |
| 6,041,314 A | 3/2000 | Davis | |
| 6,044,371 A | 3/2000 | Person et al. | |
| 6,047,324 A | 4/2000 | Ford et al. | |
| 6,049,782 A | 4/2000 | Gottesman et al. | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna et al. | |
| 6,112,191 A | 8/2000 | Burke | |
| 6,119,093 A | 9/2000 | Walker et al. | |
| 6,131,810 A | 10/2000 | Weiss et al. | |
| 6,154,770 A | 11/2000 | Kostakos | |
| 6,189,785 B1 | 2/2001 | Lowery | |
| 6,192,347 B1 | 2/2001 | Graff | |
| 6,226,623 B1 | 5/2001 | Schein et al. | |
| 6,317,783 B1 | 11/2001 | Freishtat et al. | |
| 6,324,523 B1 | 11/2001 | Killeen et al. | |
| 6,363,360 B1 | 3/2002 | Madden | |
| 6,374,231 B1 | 4/2002 | Bent et al. | |
| 6,513,020 B1 | 1/2003 | Weiss et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,124,101 B1 | 10/2006 | Mikurak | |
| 7,133,840 B1 | 11/2006 | Kenna et al. | |
| 7,203,845 B2 | 4/2007 | Sokolic et al. | |
| 7,206,761 B2 | 4/2007 | Colvin | |
| 7,216,100 B2 | 5/2007 | Elliott | |
| 7,321,874 B2 | 1/2008 | Dilip et al. | |
| 7,321,875 B2 | 1/2008 | Dilip et al. | |
| 7,328,179 B2 | 2/2008 | Sheehan et al. | |
| 7,376,606 B2 | 5/2008 | Jacobsen | |
| 7,383,223 B1 | 6/2008 | Dilip et al. | |
| 7,383,227 B2 | 6/2008 | Weinflash et al. | |
| 7,392,222 B1 | 6/2008 | Hamilton et al. | |
| 7,401,037 B2 | 7/2008 | Arena et al. | |
| 7,440,914 B2 | 10/2008 | Jacobsen | |
| 7,505,937 B2 | 3/2009 | Dilip et al. | |
| 7,509,286 B1 | 3/2009 | Bent et al. | |
| 7,519,551 B2 | 4/2009 | Bent et al. | |
| 7,529,709 B2 | 5/2009 | Volchek et al. | |
| 7,536,340 B2 | 5/2009 | Dheer et al. | |
| 7,536,350 B1 | 5/2009 | Bent et al. | |
| 7,596,522 B1 | 9/2009 | Jacobsen | |
| 7,603,307 B2 | 10/2009 | Jacobsen | |
| 7,640,199 B1 | 12/2009 | Hyland | |
| 7,657,761 B2 | 2/2010 | Sokolic et al. | |
| 7,668,771 B1 | 2/2010 | Bent et al. | |
| 7,668,772 B1 | 2/2010 | Bent et al. | |
| 7,672,886 B2 | 3/2010 | Bent et al. | |
| 7,672,901 B1 | 3/2010 | Bent et al. | |
| 7,672,902 B1 | 3/2010 | Bent et al. | |
| 7,680,716 B1 | 3/2010 | Bent et al. | |
| 7,680,734 B1 | 3/2010 | Bent et al. | |
| 7,716,131 B2 | 5/2010 | Bent et al. | |
| 7,720,755 B1 | 5/2010 | Coyle | |
| 7,729,987 B1 | 6/2010 | Wakim et al. | |
| 7,752,107 B1 * | 7/2010 | Bent et al. | 705/35 |
| 7,752,129 B2 | 7/2010 | Bent et al. | |
| 7,756,767 B2 | 7/2010 | Cluse et al. | |
| 7,769,688 B1 | 8/2010 | Bent et al. | |
| 7,797,207 B1 | 9/2010 | Dilip et al. | |
| 7,809,640 B1 | 10/2010 | Bent et al. | |
| 7,814,017 B2 | 10/2010 | Vancini et al. | |
| 7,837,100 B2 | 11/2010 | Bonalle et al. | |
| 7,860,771 B2 | 12/2010 | Colvin | |
| 7,873,571 B1 | 1/2011 | Wehmer | |
| 7,873,573 B2 | 1/2011 | Realini | |
| 7,873,677 B2 | 1/2011 | Messing et al. | |
| 7,886,969 B2 | 2/2011 | Antoo et al. | |
| 7,895,098 B2 | 2/2011 | Beard | |
| 7,895,099 B2 | 2/2011 | Whiting et al. | |
| 7,899,743 B2 | 3/2011 | Jacobsen | |
| 7,899,745 B1 | 3/2011 | Jacobsen | |
| 7,899,746 B1 | 3/2011 | Jacobsen | |
| 7,899,747 B1 | 3/2011 | Jacobsen | |
| 7,904,372 B2 | 3/2011 | Whiting et al. | |
| 7,917,433 B2 | 3/2011 | Jacobsen | |
| 7,921,057 B1 | 4/2011 | Jacobsen | |
| 7,933,821 B1 | 4/2011 | Bent et al. | |
| 7,945,511 B2 | 5/2011 | O'Brien et al. | |
| 7,996,308 B1 | 8/2011 | Bent et al. | |
| 8,015,085 B2 | 9/2011 | Blagg et al. | |
| 8,019,667 B1 | 9/2011 | Bent et al. | |
| 8,019,668 B1 | 9/2011 | Bent et al. | |
| 8,032,456 B1 | 10/2011 | Bent et al. | |
| 8,036,986 B2 | 10/2011 | Jacobsen | |
| 8,051,004 B2 | 11/2011 | Jacobsen | |
| 8,051,005 B2 | 11/2011 | Jacobsen | |
| 8,086,508 B2 | 12/2011 | Dheer et al. | |
| 8,090,651 B2 | 1/2012 | Winslow et al. | |
| 8,103,582 B1 * | 1/2012 | Zettner | 705/39 |
| 8,150,766 B1 * | 4/2012 | Bent et al. | 705/39 |
| 2001/0023414 A1 | 9/2001 | Kumar et al. | |
| 2001/0032182 A1 | 10/2001 | Kumar et al. | |
| 2002/0007330 A1 | 1/2002 | Kumar et al. | |
| 2002/0046144 A1 | 4/2002 | Graff | |
| 2002/0069147 A1 | 6/2002 | Sheehan et al. | |
| 2002/0082981 A1 | 6/2002 | Madden | |
| 2002/0087454 A1 | 7/2002 | Calo et al. | |
| 2002/0091637 A1 | 7/2002 | Bent | |
| 2002/0128951 A1 | 9/2002 | Kiron et al. | |
| 2002/0161707 A1 | 10/2002 | Cole et al. | |
| 2002/0165757 A1 | 11/2002 | Lisser | |
| 2002/0174048 A1 | 11/2002 | Dheer et al. | |
| 2002/0178098 A1 | 11/2002 | Beard | |
| 2002/0194099 A1 | 12/2002 | Weiss | |
| 2003/0023529 A1 | 1/2003 | Jacobsen | |
| 2003/0041003 A1 | 2/2003 | Kayser, III | |
| 2003/0080185 A1 | 5/2003 | Werther | |
| 2003/0135437 A1 | 7/2003 | Jacobsen | |

| | | |
|---|---|---|
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del et al. |
| 2004/0177036 A1 | 9/2004 | Nutahara et al. |
| 2004/0249741 A1 | 12/2004 | Understein |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0047593 A1 | 3/2006 | Naratil et al. |
| 2006/0106703 A1 | 5/2006 | Del et al. |
| 2006/0155644 A1 | 7/2006 | Reid et al. |
| 2006/0167773 A1 | 7/2006 | Yang et al. |
| 2006/0212389 A2 | 9/2006 | Bent et al. |
| 2006/0213980 A1 | 9/2006 | Geller et al. |
| 2006/0273152 A1 | 12/2006 | Fields |
| 2007/0043666 A1 | 2/2007 | Burdette |
| 2007/0118449 A1 | 5/2007 | De La Motte |
| 2007/0130065 A1 | 6/2007 | Staab et al. |
| 2007/0143196 A1 | 6/2007 | Colvin |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0138412 A1 | 5/2009 | Jacobsen |
| 2009/0327154 A1 | 12/2009 | Van Vooren et al. |
| 2011/0106703 A1 | 5/2011 | Jay et al. |
| 2011/0208640 A1 | 8/2011 | Geoghegan et al. |
| 2011/0246359 A1 | 10/2011 | O'Brien et al. |

FOREIGN PATENT DOCUMENTS

| | | | |
|---|---|---|---|
| WO | WO-99/18529 | A1 | 4/1999 |
| WO | WO-02/42952 | A1 | 5/2002 |
| WO | WO-03/012580 | A2 | 2/2003 |
| WO | WO-2005/006111 | A2 | 1/2005 |

OTHER PUBLICATIONS

Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
2 CDs (1) Non-Confidential Exhibits and Material regarding Deutsch Bank Trust Company Americas' (DBTCA) $2^{nd}$ Supp Res to Double Rock's Interrogatory No. 2; (2) Prior Art for IC Non-Confidential Material—Bates-numbered documents for Exhibits 2, 5, 8, 9, and 10 Invalidity Charts, Jul. 2010.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to R.L. Kratzer, from T.J. Vezeau, Re: United States Patent No. 6,374,231, dated Jan. 10, 2003, 1 page.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.

Letter to R.L. Kratzer, from T.J. Vezeau, Re: United States Patent No. 6,374,231, dated Jan. 10, 2003 (with various attachments), 128 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Ralph, Customer Service, from Bruce Bent II, Re: Reserve IDA, Sep. 4, 1997, 1 page.
Memo to Marianne, Pat, Bruce Bent, from Bruce Bent II, Re: Reserve Insured Deposit Account, Sep. 4, 1997, 1 page.
American Express—Meeting Notes, Sep. 26, 2000, 2 pages.
American Express Financial Advisors Customized FDIC Product with Tiered Balances, Jan. 24, 2001, 2 pages.
American Express Conference Call Minutes, Topic: Tiered Balances, Jan. 25, 2001 @ 3:00pm-4:00pm, 2 pages.
Letter to A.J. Bufalino, from C.R. Macedo, Re: Reserve Management Corporation, Wayne Hummer Investments LLC, May 8, 2007, (enclosing Jan. 3, 2006 letter to A.J. Bufalino, Feb. 23, 2006 letter to A.J. Bufalino, Mar. 16, 2006 letter to C. Macedo, U.S. Patent No. 6,374,231, U.S. Publication No. 2002/0091637 A1, U.S. Publication No. 2005/0108149 A1, U.S. Publication No. 2005/0228733 A1, U.S. Publication No. 2006/0212385 A2, U.S. Publication No. 2006/0212389 A2), 510 pages.
Merrill Lynch & Co., Inc., Form 10-K405 (Annual Report (Regulation S-K, item 405)), Filed Mar. 14, 2002 for the Period Ending Dec. 18, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Programs$^{SM}$, (attached Q&A: Important Information about the New Salomon Smith Barney Bank Deposit Program), Aug. 16, 2020, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch-Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL:http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Aryan, 4 pages.
Merrill Lynch & Co Inc-MER, 10k Wizard, Form 8-K, "Report of Unscheduled Material Events or Corporate Changes," Filed Mar. 7, 2002, 51 pages.

Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
American Express—Meeting Notes Sep. 26, 2000, 2 pages.
American Express Conference Call Minutes, Jan. 25, 2001 @ 3:00pm-4:00pm, Topic: Tiered Balances, 2 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sept 1986; 36 pages.
Merrill Lynch, The Merrill Lynch Capital Builder$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
U.S. Appl. No. 12/453,390, filed May 8, 2009 Bruce Bent.
*Island Intellectual Property LLC et al. v. Deutsche Bank AG, et al.*; Memorandum and Order; Case 1:09-cv-02675-KBF; Doc. 289; Feb. 14, 2012; pp. 1-28.

*Island Intellectual Property LLC et al. v. Deutsche Bank AG, et al.*; Order; Case 1:09-cv-02675-KBF; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al. v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by *Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC, et al. v. Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC, et al. v. Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.

Lawsuit by *Island Intellectual Property LLC, et al. v. Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC, et al. v. Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC, et al. v. Deutsche Bank Trust Company Americas, et al.*; Order; Dec. 7, 2011; Case 1:09-cv-02675-VM, Document 212.
Lawsuit by *Island Intellectual Property LLC, et al. v. Deutsche Bank Trust Company Americas, et al.*; Special Master's Report and Recommended Decision on Defendants' Summary Judgment Motion of Invalidity Under 35 U.S.C. § 101; Dec. 19, 2011.
Lawsuit by *Island Intellectual Property LLC, et al. v. Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al. v. Deutsche Bank Trust Co., et al.*; Nov. 28, 2011; Case 1:09-cv-02675-VM; Document 211.
Martens, Don W.; letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.
Scottrade Bank Deposit Program—Terms, Conditions & Disclosures; Author unknown; 8-11; pp. 1-3.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.

Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets.
Letter From Oliver I. Ireland, Associate General Counsel, Board of Governors of the Federal Reserve System, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. And Merrill Lynch & Co., Inc. et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, 3 sheets.
Investors MoneyAccount$^{SM}$ (an FDIC-insured money market account), 4 sheets.
Investors MoneyAccount$^{SM}$ The FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, *6 FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review © A Publication of *Meyer Weekly Interest Rate Survey*, A Look At Tiers, vol. II, No. 4, Apr. 1987, 6 pgs.
Interest Rate Review © A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services the Way You Want, When You Want Them," Jan. 2000 4 Sheets.
Merrill Lynch, Pierce, Fenner & Smith Incorporated, "Information Statement," 2000, 12 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, 3 sheets.
Quest Insured Account, *Information Statement*, 5 sheets.
OCC Insured Bank Deposit Account, 3 sheets.
Insured Bank Deposit Account, *Information Statement*, Jul. 1, 2000, 2 sheets.

Letter from Marilyn J. Hensle, announcing Salomon Smith Barney Bank Deposit Program.$^{SM}$, with Q&A, 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merrill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.

Bank Insured Deposit Program, D.A. Davidson & Co., Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. PLUS Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, www.optionsxpress.com/welcom/faq/aq/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/fao/fdic.aspx Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/Chart/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, 2 sheets.
Client account agreement to Sterne Agee Clearing, INC, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDProqrams.asp, Jan. 15, 2010, 2 sheets.
Money market insured deposit program, East West Bank, www.eastweatbank.com/Enqlish/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.orq/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.

This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.

Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, Linkedin, http://74.125.93.132/search?=cache:5hs9cebUSjgJ:www.linkedin.com/pub/christopher-mccrum/..., Nov. 2, 2009, 2 sheets.
Kentucky Bankers Association, Alternative for excess deposit coverage Free Webiners, http://209.235.145/cgi-bin/websuite/tcsassnwebsuite.pl?.., Nov. 2, 2009, 2 sheets.
Kentucky Bankers Association, Alternative for excess deposit coverage Free Webiners, http://209.235.145/cgi-bin/websuite/tcsassnwebsuite.pl?..., Nov. 2, 2009, 2 sheets.
Kentucky Bankers Association Detailed listening, http://member.kybanks.com/source/members..., Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/ Nov. 2, 2009, 2 sheets.
Fast fax-back reply, Kentucky Bankers Association, 1 sheet.
Deutsche Bank, Deutsche Bank insured deposit program, 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in Sep., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money Account$^{SM}$ System, U.S. Patent No. 7,509,286, received in Mar. 2010, 26 pgs.
Exhibit 3, Invalidity Chart: Insured Money Account System, U.S. Patent No. 7,509,286, received in Mar. 2010, 26 pgs.
Exhibit 4, Invalidity Chart: U.S. Patent No. 4,985,833 (Oncken), U.S. Patent 7,509,286, received in Mar. 2010, 21 pgs.
Exhibit 5, Invalidity Chart: First City Bank of Texas' Insured Savings Program, U.S. Patent No. 7,509,286, received in Mar. 2010, 39 pgs.
Exhibit 6, Invalidity Chart: Quest Insured Account, U.S. Patent No. 7,509,286, received in Mar. 2010, 19 pgs.
Exhibit 7, Invalidity Chart: CIBC World Markets—Insured Bank Deposit Account, U.S. Patent No. 7,509,286, received in Mar. 2010, 16 pgs.
Exhibit 8, Invalidity Chart: Merrill Lynch CMA/ISA Service, U.S. Patent No. 7,509,286, received in Mar. 2010, 72 pgs.

Exhibit 9, Invalidity Chart: 1983 Fed Letter, U.S. Patent No. 7,509,286, received in Mar. 2010,, 16 pgs.
Exhibit 10, Invalidity Chart: Merrill Lynch Banking Advantage Program ("MLBA Program"), U.S. Patent No. 7,509,286, received in Mar. 2010,, 22 pgs.
Exhibit 11, Invalidity Chart: Merrill Lynch & You + MLBA Information Statement, U.S. Patent No. 7,509,286, received in Mar. 2010,, 18 pgs.
Exhibit 12, Invalidity Chart: Smith Barney Insured Deposit Account, U.S. Patent No. 7,509,286, received in Mar. 2010, 22 pgs.
Exhibit 13, Invalidity Chart: Smith Barney Bank Deposit Program, U.S. Patent No. 7,509,286, received in Mar. 2010, 18 pgs.
Exhibit 14, Invalidity Chart: Alliance Insured Account, U.S. Patent No. 7,509,286, received in Mar. 2010, 16 pgs.
Exhibit 15, Invalidity Chart: Reserve's American Express Presentation, U.S. Patent No. 7,509,286, received in Mar. 2010, 16 pgs.
Exhibit 16, Invalidity Chart: U.S. Patent No. 7,376,606 (Jacobsen), U.S. Patent No. 7,536,350, received in Mar. 2010, 6 pgs.
Exhibit 17, Obviousness Combinations Chart, U.S. Patent No. 7,509,286, received in Mar. 2010, 351 pgs.
U.S. Appl. No. 12/025,402, filed Feb. 4, 2008, Bent.
Dreyfus Insured Deposit Program Disclosure Statement and Terms and Conditions, received Mar. 2008, 12 pages.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772; 7,672,886; and 7,680,734; and Exhibits A-R; Civil Action No. 09 Civ. 2675(VM)(AJP), Oct. 28, 2010; 1,119 pages.
Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

U.S. Appl. No. 09/677,535, filed Oct. 2, 2000, Bruce Bent et al.
U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent, II et al.
U.S. Appl. No. 12/829,961, filed Jul. 2, 2010, Bruce Bent, et al.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.

Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deposit Insurance Corporation of Ontario, 1 page, (http://www.dico.com/.

Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus a BNY Mellon Company, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
FDICc, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_...
Garmhausen, "Matching Small Banks with Large Muni Deposits," American Banker, Online The Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.

Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stern, including Exhibits A, B, C, D, E and F, Nov. 12 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks".
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).
Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14 2007, Case No. 07-318 (RJS) (Document 67).
Lawsuit by Carlo DeBlasio et al. against Merrill Lynch & Co., Inc. et al., Declaration of Scott D. Musoff in Support of the Merrill Lynch Defendants' Motion to Dismiss the Second Amended Class Action Complaint, ECF Case, Nov. 12 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.

Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 CIV 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.
Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).
Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).
Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).
Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.
Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LEXSEE 1985 Sec No- Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.

Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of CASH: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", 2 Sheets.
Merrill Lynch Announces Beyond Banking, The Power of Advice For Smarter Cash Management, Jan. 8, 2 Sheets.
Merrill Moves CMA Cash to Bank, Street Talk, on Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD, 4 Sheets.
O'Brian, "Money-Market Funds Suit Many Investors, But Proud Creator Frets About Extra Risk," Re-Printed From the Wall Street Journal, Monday, Nov. 6, 2000, Dow Jones & Company, Inc., 2 Sheets.
On Wall Street, Helping Brokers Build a More Successful Business, The Power of CASH, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Reserve Management Corporation, Reserve Insured Deposits, Ser. No. 76/315,600, Issued.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From the Cash Management Expert, 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.

Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Case for "CORE" Deposits, Historic Degree of Stability, 2006, 1 page.

* cited by examiner

METHOD AND SYSTEM FOR DETERMINING FEES FOR DEPOSITS ALLOCATED OVER A PLURALITY OF DEPOSIT INSTITUTIONS

CROSS-REFERENCE TO RELATED PATENT APPLICATIONS

This application claims priority to and hereby incorporates all of the subject matter of Provisional Application U.S. Application 61/218,810 filed on Jun. 19, 2009, which is incorporated herein by reference in its entirety as if fully set forth herein.

FIELD OF THE INVENTION

The field of the invention generally relates to administration of client accounts, and the administration of interest-bearing deposit accounts at deposit institutions.

SUMMARY OF THE INVENTION

In one embodiment, a system is disclosed comprising: one or more electronic databases, stored on one or more computer-readable media, comprising: (1) aggregated account information for a plurality of Federal Deposit Insurance Corporation (FDIC)-insured and interest-bearing aggregated deposit accounts held in a plurality of deposit institutions, in a program, wherein funds from client accounts of a plurality of clients are aggregated with funds of other client accounts in the aggregated deposit accounts held in the deposit institutions in the program, where the client account represents funds of the respective client held in one or more of the aggregated deposit accounts; and (2) client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account; and one or more computers comprising memory wherein the memory stores computer-readable instructions that, when executed, cause the one or more computers to perform the following steps for each respective client account, i, of more than one of said client accounts: (1) determining a fee tier with a corresponding tiered fee rate, $F_i$, for the client account, i, from a plurality of fee tiers, based on one or more criteria; (2) determining a deposit institution interest rate, $BInt_{ni}$, for each deposit institution, in the program holding or to hold at least an amount, $A_{ni}$, of the fund balance of the respective client account; (3) determining a respective client interest rate, $ClInt_{ni}$, for each respective deposit institution, $n_i$, holding at least an amount, $A_{ni}$, of the fund balance of the respective client account, wherein the respective client interest rate, $ClInt_{ni}$, for the respective deposit institution, $n_i$, is determined by performing a mathematical operation so that the tiered fee rate, $F_i$, plus the client interest rate, $ClInt_{ni}$, substantially equal the deposit institution interest rate, $BInt_n$, for the respective deposit institution, $n_i$; (4) calculating or having calculated a fee amount for funds of the respective client account held in each of the one or more aggregated deposit accounts holding an amount of the fund balance of the respective client account, with the fee amount determined for a respective aggregated deposit account holding funds of the client account based, at least in part, on the determined tiered fee rate, $F_i$, for the respective client account and the amount, $A_{ni}$, of the fund balance of the respective client account held in the respective aggregated deposit account; (5) calculating or having calculated an interest amount for each aggregated deposit account holding an amount of the fund balance of the respective client account, wherein the interest amount for the respective aggregated deposit account is determined based, at least in part, on the determined client interest rate, $ClInt_{ni}$ for the deposit institution, $n_i$ with the aggregated deposit account and the at least the amount, $A_{ni}$, of the fund balance of the respective client account held in the respective aggregated deposit account; (6) determining a respective total amount of interest for the respective client account, i, comprising at least summing the interest amounts of the respective one or more aggregated deposit accounts holding funds of the respective client account, i; and (7) updating the respective fund balance for the respective client account in the one or more electronic databases with this total amount of interest.

In a further embodiment, the memory storing computer-readable instructions for: determining a total amount of fees due for a respective client account by summing the one or more fee amounts determined for the one or more aggregated deposit accounts holding funds of the respective client account i.

In a further embodiment, one of the one or more criteria comprises a level of the client fund balance in relation to ranges set forth in a tier table.

In a further embodiment, one of the one or more criteria comprises meeting one or more relationship requirements for the client account stored in the one or more databases.

In a further embodiment, the one or more databases further comprise fee tier information comprising the plurality of fee tiers, each with a corresponding tiered fee rate, $F_i$.

In a further embodiment, each of a plurality of the respective fee tiers comprises a respective uniform tiered fee rate, $F_i$, to be applied to the respective client funds.

In a further embodiment, each of one or more fee tiers comprises an algorithm to be applied to client funds, and further comprising the memory storing computer-readable instructions for: calculating the tiered fee rate, $F_i$, to be applied to the client fund balance within the monetary range using the algorithm.

In a further embodiment, at least one of the fee tiers comprises an algorithm to be applied to a fund balance and that includes a tiered fee rate, $F_i$, to be applied to the client fund balance to obtain a numerical result, and an amount to be added to or subtracted from the numerical result.

In a further embodiment, the tiered fee rate, $F_i$, is based in part on a criterion comprising specified profile information stored in the one or more electronic databases.

In a further embodiment, the memory stores computer-readable instructions for: calculating, for each of a plurality of the deposit institutions, a respective net deposit institution transfer amount for the respective deposit institution; and generating instructions to transfer funds to or from at least one of the one or more aggregated deposit accounts in one or more of the respective deposit institutions in the program to cause, for each of one or more of the deposit institutions, a respective balance of funds in the respective deposit institution deposited in the one or more aggregated deposit accounts held therein to reflect a respective net deposit institution transfer amount calculated for the respective deposit institution.

In a further embodiment, computer-readable instructions are stored in the memory for causing the fee amount calculation comprise computer-readable instructions for adding a fixed amount to or subtracting a fixed amount from a result of a multiplication of the determined tiered fee rate, $F_i$, for the respective client account and the amount, $A_{ni}$, of the fund balance of the respective client account held in the respective aggregated deposit account.

In a further embodiment, the memory stores computer-readable instructions for calculating fee amounts for client accounts in a defined benefit plan.

In a further embodiment, the memory stores computer-readable instructions for: obtaining loan transaction data comprising one or more loan amounts for one of the client accounts, i, in the defined benefit plan; reducing the client fund balance for the one client account, i, by the one or more loan amounts in the loan transaction data to obtain a reduced client fund balance for the one client account, i; selecting a fee tier and a corresponding tiered fee rate, $F_i$, for the client account, i, based on at least one criterion of whether the reduced client fund is within a range set forth for the fee tier; and calculating fee amounts for the one client account, i, based on the reduced client fund balance.

In a further embodiment, the computer-readable instructions stored in the memory comprise instructions for calculating fee amounts for accounts in a pension benefit plan.

In a further embodiment, the memory stores computer-readable instructions for: determining a fee waiver rate for at least one of the fee tiers, based on one or more waiver criteria; calculating a discounted tiered fee rate, $F_i$, for the one fee tier by at least subtracting the fee waiver rate from the tiered fee rate, $F_i$, for the one fee tier; determining, the respective client interest rate, $ClInt_{ni}$, for one or more client accounts with client fund balances in a range for the one fee tier, using the discounted tiered fee rate, $F_i$; and calculating the fee amounts for one or more of the client accounts with client fund balances, in the range for the one fee tier, for each respective deposit institution, $n_i$, holding at least an amount of the funds, $A_{ni}$, of the one or more client accounts, using the discounted tiered fee rate, $F_i$.

In a further embodiment, one of the one or more waiver criteria comprises an algorithm to be performed to determine the discounted tiered fee rate, $F_i$, if any, and the memory stores computer-readable instructions for performing the algorithm, the algorithm comprising: determining a fee market rate for deposits; determining whether a difference between the deposit market rate and the tiered fee rate, $F_i$, in a given fee tier equals or exceeds a threshold amount; and if the difference does equal or exceed the threshold amount, determining the fee waiver rate.

In a further embodiment, the memory stores computer-readable instructions for: determining a deposit market rate; determining whether a difference between the deposit market rate and the tiered fee rate, $F_i$, in a given fee tier equals or exceeds a threshold amount; and if the difference does equal or exceed the threshold amount, setting the fee tier rate, Fi, approximately equal to the deposit market rate.

In a further embodiment, the memory stores computer-readable instructions for: receiving transfer data consisting only of deposits and withdrawals made on behalf of the respective clients resulting from investment decisions for investments in defined benefit plans; and generating instructions to deposit/transfer to, or to withdraw/transfer from, one or more of the aggregated deposit accounts in one or more of the deposit institutions, based at least in part, on the transfer data.

In a further embodiment, the memory stores computer-readable instructions for generating instructions to deposit/transfer funds to one selected from the group of money funds, and certificate of deposit, based at least in part, on the transfer data.

In a further embodiment, the memory stores computer-readable instructions for: receiving transfer data comprising transactions initiated via ACH, wire, credit card, debit card, or check; and generating instructions to deposit/transfer to, or to withdraw/transfer from, one or more of the aggregated deposit accounts in one or more of the deposit institutions, based at least in part, on the transfer data.

In a further embodiment, the client account consists of funds of the client held only in the aggregated deposit accounts of the program, and the fund balance is a balance of funds of the client held in the program in one or more of the deposit institutions in one or more aggregated deposit accounts therein.

In a further embodiment, the client account comprises funds of the client held in the deposit institutions in the program and also funds of the client held in other program investments vehicles, and the fund balance is the total of funds held in the program aggregated deposit account and in other program investment vehicles.

In a further embodiment, the memory stores computer-readable instructions for (1) receiving, by the one or more computers, data for one or more deposits/transfers for one or more of said client accounts and/or data for one or more withdrawals/transfers from one or more of said client accounts; (2) updating, by the one or more computers, the one or more electronic databases with the data for one or more of the client accounts, comprising for a respective one of the client accounts with deposit/transfer data and/or withdrawal/transfer data, updating: (i) the respective fund balance of the respective client account; and (ii) the respective amount, $A_{ni}$, of the fund balance of the client account held in at least one of the one or more aggregated deposit accounts holding funds of the respective client account.

In another embodiment, a method is disclosed, comprising: accessing, by one or more computers, in the performance of one or more of the following steps, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of deposit institutions, N, in the program, wherein funds from client accounts of a plurality of clients are aggregated with funds of other client accounts in the aggregated deposit accounts held in the deposit institutions in the program, where the client account represents funds of the respective client held in one or more of the aggregated deposit accounts; and (2) client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account; and performing, by the one or more computers, the following steps for each respective client account, i, of more than one of said client accounts: (1) determining a fee tier with a corresponding tiered fee rate, $F_i$, for the client account, i, from a plurality of fee tiers, based on one or more criteria; (2) determining a deposit institution interest rate, $BInt_{ni}$, for each deposit institution, $n_i$, in the program holding or to hold at least an amount, $A_{ni}$, of the fund balance of the respective client account; (3) determining a respective client interest rate, $ClInt_{ni}$, for each respective deposit institution, $n_i$, holding at least an amount, $A_{ni}$, of the fund balance of the respective client account, wherein the respective client interest rate, $ClInt_{ni}$, for the respective deposit institution, $n_i$, is determined by performing a mathematical operation so that the tiered fee rate, $F_i$, plus the client interest rate, $ClInt_{ni}$, substantially equal the deposit institution interest rate, $BInt_{ni}$, for the respective deposit institution, $n_i$; (4) calculating or having calculated a fee amount for funds of the respective client account held in each of the one or more aggregated deposit accounts holding an amount of the fund balance of the respective client account, with the fee amount determined for a respective aggregated deposit account holding funds of the client account based, at least in part, on the determined tiered fee rate, $F_i$, for the respective client account and the at least the amount, $A_{ni}$, of the fund balance of the respective client account held in the respective aggregated deposit account; (5) calculating or having calculated an interest amount for each aggregated deposit account holding an amount of the fund balance of the respective client account, wherein the interest amount for the respective aggregated deposit account is determined based, at least in part, on the determined client interest rate, $ClInt_{ni}$ for the deposit institution, $n_i$ with the aggregated deposit account and the at least the amount, $A_{ni}$, of the fund balance of the respective client account held in the respective aggregated deposit account; (6) determining a respective total amount of interest for the respective client account, i, comprising at least summing the interest amounts of the respective one or more aggregated deposit accounts holding funds of the respective client account, i; and (7) updating the respective fund balance for the respective client account in the one or more electronic databases with this total amount of interest.

In another embodiment, a program product is disclosed, comprising: at least one computer-readable media having computer-readable program code embodied therein or among them if more than one, to be executed by one or more computers, for causing the one or more computers to perform the method: accessing, by the one or more computers, in the performance of one or more of the following steps, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of deposit institutions, N, in a program, wherein funds from client accounts of a plurality of clients are aggregated with funds of other client accounts in the aggregated deposit accounts held in the deposit institutions in the program, where the client account represents funds of the respective client held in one or more of the aggregated deposit accounts; and (2) client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account; performing, by the one or more computers, the following steps for each respective client account, i, of more than one of said client accounts: (1) determining a fee tier with a corresponding tiered fee rate, $F_i$, for the client account, i, from a plurality of fee tiers, based on one or more criteria; (2) determining a deposit institution interest rate, $BInt_{ni}$, for each deposit institution, $n_i$, in the program holding or to hold at least an amount, $A_{ni}$, of the fund balance of the respective client account; (3) determining a respective client interest rate, $ClInt_{ni}$, for each respective deposit institution, $n_i$, holding at least an amount, $A_{ni}$, of the fund balance of the respective client account, wherein the respective client interest rate, $ClInt_{ni}$, for the respective deposit institution, $n_i$, is determined by performing a mathematical operation so that the tiered fee rate, $F_i$, plus the client interest rate, $ClInt_{ni}$, substantially equal the deposit institution interest rate, $BInt_n$, for the respective deposit institution, $n_i$; (4) calculating or having calculated a fee amount for funds of the respective client held in each of the one or more aggregated deposit accounts holding an amount of the fund balance of the respective client account, with the fee amount determined for a respective aggregated deposit account holding funds of the client account based, at least in part, on the determined tiered fee rate, $F_i$, for the respective client account and the at least the amount, $A_{ni}$, of the fund balance of the respective client account held in the respective aggregated deposit account; (5) calculating or having calculated an interest amount for each aggregated deposit account holding an amount of the fund balance of the respective client account, wherein the interest amount for the respective aggregated deposit account is determined based, at least in part, on the determined client interest rate, $ClInt_{ni}$ for the deposit institution, $n_i$ with the aggregated deposit account and the at least the amount, $A_{ni}$, of the fund balance of the respective client account held in the respective aggregated deposit account; (6) determining a respective total amount of interest for the respective client account, i, comprising at least summing the interest amounts of the respective one or more aggregated deposit accounts holding funds of the respective client account, i; and (7) updating the respective fund balance for the respective client account in the one or more electronic databases with this total amount of interest.

In another embodiment, a computer system is disclosed, comprising: one or more electronic databases, stored on one or more computer-readable media, comprising: (1) aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the one or more aggregated deposit accounts held in the one or more deposit institutions in the program, where the client account represents funds of the respective client held in one or more of the aggregated deposit accounts; and (2) client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account; and one or more computers comprising memory wherein the memory stores computer-readable instructions that, when executed, cause the one or more computers to perform the following steps for each respective client account, i, of more than one of said client accounts: (1) determining or having determined or obtaining a fee tier for the client account, i, from among a plurality of fee tiers; (2) determining or having determined or obtaining, for each of the one or more aggregated deposit accounts holding a respective amount, $A_{ni}$, of the fund balance of the respective client account, a fee amount for funds of the respective client account held in the respective aggregated deposit account; (3) calculating or having calculated a client account interest amount for each aggregated deposit account holding a respective amount, $A_{ni}$, of the fund balance of the respective client account, wherein the interest amount for the respective aggregated deposit account holding funds of the respective client account is determined based, at least in part, on the amount, $A_{ni}$, of the fund balance of the respective client account held in the respective aggregated deposit account; (4) determining a respective total amount of interest for the respective client account, i, comprising at least summing the one or more interest amounts of the one or more aggregated deposit accounts holding a respective amount, $A_{ni}$, of the fund balance of the respective client account, i; and (5) updating the respective fund balance for the respective client account in the one or more electronic databases with this total amount of interest, wherein at least one of the one or more aggregated accounts holds funds of client accounts in different fee tiers.

In a further embodiment, the determining or having determined or obtaining a fee tier for the client account, i, is based at least in part on one or more criteria.

In a further embodiment, the fee tier has a corresponding tiered fee rate, $F_i$, or a fixed fee for the client account, i.

In a further embodiment, the fee tier has a corresponding tiered fee rate, $F_i$, and the determining or having determined or obtaining a fee amount for funds of the respective client account held in each of the one or more aggregated deposit accounts holding a respective amount, $A_{ni}$, of the fund balance of the respective client account, is based, at least in part, on the fee tier rate, $F_i$, for the respective client account and the at least the amount, $A_{ni}$, of the fund balance of the respective client account held in the respective aggregated deposit account.

In a further embodiment, the determining or having determined or obtaining a fee tier for the client account, i, comprises determining the fee tier based at least in part on the respective fund balance for the respective client account.

In a further embodiment, the calculating or having calculated a client account interest amount for each aggregated deposit account holding a respective amount, $A_{ni}$, of the fund balance of the respective client account is calculated iteratively for each sub-period of the period.

In a further embodiment, the calculating or having calculated a client account interest amount for each aggregated deposit account holding a respective amount, $A_{ni}$, of the fund balance of the respective client account, is based, at least in part, on the amount, $A_{ni}$, of the fund balance of the respective client account held in the respective aggregated deposit account and the fee amount for the respective client account for the respective aggregated deposit account.

In a further embodiment, there are a plurality of deposit institutions, each holding at least one of the aggregated deposit account.

In a further embodiment, the client account also represents funds in other program investment vehicles.

In a further embodiment, the other program investment vehicles are aggregated investment vehicles.

In another embodiment, a computer system is disclosed, comprising: one or more electronic databases, stored on one or more computer-readable media, comprising: (1) aggregated account information for one or more of Federal Deposit Insurance Corporation (FDIC)-insured and interest-bearing aggregated deposit accounts held in one or more deposit institutions in a program, wherein funds from client accounts of a plurality of clients are aggregated with funds of other client accounts in the one or more aggregated deposit accounts held in the one or more deposit institutions in the program, where the client account represents funds of the respective client held in one or more of the one or more aggregated deposit accounts; and (2) client account information for each of more than one of the respective client accounts comprising: (a) a respective fund balance in the respective client account; and (b) a respective amount of the fund balance of the respective client account held in each of the one or more of the aggregated deposit accounts holding funds of the client account; and one or more computers comprising memory wherein the memory stores computer-readable instructions that, when executed, cause the one or more computers to perform the following steps for each respective client account, i, of more than one of said client accounts: (1) determining or having determined or accessing an available overall program fee amount for a period that may be used for fees for a plurality of client accounts; (2) determining or having determined or obtaining, for each of more than one of the client accounts, a fee tier for the respective client account; (3) dividing the available overall program fee amount among a plurality of tiers, based at least in part, on a total of client account funds in the respective tier, to obtain a respective tier fee amount for each of the respective tiers; (4) determining or having determined or obtaining, for each of more than one of the client accounts, a respective client account fee based at least in part on the fee tier for the respective client account; (5) determining or having determined or accessing client account interest for each of the more than one of respective client accounts, based at least in part, on the respective fund balance of the respective client account and based at least in part, on the client account fee for the respective client account; and (6) updating the one or more databases with information relating to the interest for one or more of the client accounts, wherein at least one of the one or more aggregated accounts holds funds of client accounts in different fee tiers.

In a further embodiment, the determining or having determined or obtaining, for each of more than one of the client accounts, a respective client account fee based at least in part on the fee tier for the respective client account comprises calculating a pro rata share of the respective fee tier amount for the respective client account in the respective fee tier based on its respective client account balance.

In a further embodiment, each of more than one of the fee tiers has a corresponding tier fee rate, $F_i$, and the determining or having determined or obtaining, for each of more than one of the client accounts, a respective client account fee comprises determining the client account fee based at least in part on the tier fee rate, $F_i$, and the respective fund balance in the respective client account.

In a further embodiment, the overall program fee amount is determined so that the overall program fee amount and a determined interest amount for the client accounts in the program equals a total of interest earned for the period for funds of the client accounts held in the one or more aggregated deposit accounts.

In a further embodiment, the dividing the available overall program fee amount among a plurality of tiers comprises determining a pro rata share of funds in that respective tier relative to a total of funds in all of the tiers.

In a further embodiment, the client account fee is determined based on a fixed fee associated with the fee tier.

In a further embodiment, there are a plurality of deposit institutions, each holding at least one of the aggregated deposit accounts.

In another embodiment, a computer system is disclosed, comprising: one or more electronic databases, stored on one or more computer-readable media, comprising: (1) aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the aggregated deposit accounts held in the deposit institutions in the program, where the client account represents funds of the respective client held in one or more of the aggregated deposit accounts; and (2) client account information for each of more than one of the respective client accounts comprising: (a) a respective fund balance in the respective client account; and (b) a respective amount, $A_{ni}$, of the fund balance of the respective client account held in each of the one or more of the aggregated deposit accounts holding funds of the client account; and one or more computers comprising memory wherein the memory stores computer-readable instructions that, when executed, cause the one or more computers to perform the following steps for each respective client account, i, of more than one of said client accounts: (1) determining or having determined or accessing a fee tier from among a plurality of fee tiers for the respective client account; (2) allocating funds of the client accounts to one or more of the aggregated deposit accounts based at least in part on one or more criteria, wherein some of the client accounts in a plurality of different fee tiers are allocated to the same aggregated deposit account, with the allocation; (3) determining or having determined a total interest amount for the respective client account for a period, based, at least in part, on interest earned by the one or more amounts, $A_{ni}$, of the respective client account held in each of the one or more aggregated deposit accounts holding funds of the respective client account; (4) calculating or having calculated or obtaining a fee amount for the respective client account, based at least in part, on the fee tier for the respective client account; (5) determining or having determined a client account interest so that the fee amount for the respective client account and the client account interest substantially equal the total interest amount for the respective client account; and (6) updating the respective fund balance for the respective client account in the one or more databases based at least in part on the client account interest.

In a further embodiment, the fee tier for a respective client account has been set based, at least in part, on whether the respective fund balance of the respective client account is within one of a plurality of fee tier balance ranges.

In a further embodiment, each of more than one of the fee tiers has a corresponding tier fee rate, $F_i$ for the client account, i, In a further embodiment, the one or more criteria comprise at least one selected from the group of a respective maximum cap balance (s) or a respective minimum cap balance(s) for the program to be held in respective deposit institution(s), client deposit institution preference or exclusion information, a bank reciprocity requirement for distributing client funds among banks, client account insurance limits.

In a further embodiment, the memory storing computer-readable instructions for: determining whether or not to adjust the client account interest based, at least in part, on comparing or having compared the client account interest for the respective client account to a threshold amount; and adjusting or having adjusted the client account interest based on a result of the comparing operation.

In a further embodiment, the memory storing computer-readable instructions for determining whether or not to adjust the client account fee based, at least in part, on comparing or having compared the client account interest for the respective client account to a threshold amount; and adjusting or having adjusted the client account fee based on a result of the determining operation.

In a further embodiment, the threshold is based, at least in part, on a promised interest rate for the respective client account.

In a further embodiment, the threshold is based, at least in part, on a market interest rate.

In a further embodiment, the adjustment is a factor or an amount.

In a further embodiment, the determining or having determined the total client account interest comprises obtaining total earned program interest for the period for program funds held in each aggregated deposit account holding program funds; and determining or having determined a pro rata share of the respective client account of the total earned program interest.

In another embodiment, a method is disclosed, comprising: (1) accessing, by one or more computers, one or more electronic databases, stored on one or more computer-readable media, comprising: aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the one or more aggregated deposit accounts held in the one or more deposit institutions in the program, where the client account represents funds of the respective client held in one or more of the aggregated deposit accounts; and client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account; (2) for each respective client account, i, of more than one of said client accounts, determining or having determined or obtaining, by the one or more computers, a fee tier for the client account, i, from among a plurality of fee tiers; (3) determining or having determined or obtaining, by the one or more computers, for each of the one or more aggregated deposit accounts holding a respective amount, $A_{ni}$, of the fund balance of the respective client account, a fee amount for funds of the respective client account held in the respective aggregated deposit account; (4) calculating or having calculated, by the one or more computers, a client account interest amount for each aggregated deposit account holding a respective amount, $A_{ni}$, of the fund balance of the respective client account, wherein the interest amount for the respective aggregated deposit account holding funds of the respective client account is determined based, at least in part, on the amount, $A_{ni}$, of the fund balance of the respective client account held in the respective aggregated deposit account; (5) determining, by the one or more computers, a respective total amount of interest for the respective client account, i, comprising at least summing the one or more interest amounts of the one or more aggregated deposit accounts holding a respective amount, $A_{ni}$, of the fund balance of the respective client account, i; and (6) updating, by the one or more computers, the respective fund balance for the respective client account in the one or more electronic databases with this total amount of interest, wherein at least one of the one or more aggregated accounts holds funds of client accounts in different fee tiers.

In another embodiment, a method is disclosed, comprising: (1) accessing, by one or more computers, one or more electronic databases, stored on one or more computer-readable media, comprising: aggregated account information for one or more of Federal Deposit Insurance Corporation (FDIC)-insured and interest-bearing aggregated deposit accounts held in one or more deposit institutions in a program, wherein funds from client accounts of a plurality of clients are aggregated with funds of other client accounts in the one or more aggregated deposit accounts held in the one or more deposit institutions in the program, where the client account represents funds of the respective client held in one or more of the one or more aggregated deposit accounts; and client account information for each of more than one of the respective client accounts comprising: (a) a respective fund balance in the respective client account; and (b) a respective amount of the fund balance of the respective client account held in each of the one or more of the aggregated deposit accounts holding funds of the client account; (2) determining or having determined or accessing, by the one or more computers, an available overall program fee amount for a period that may be used for fees for a plurality of the client accounts; (3) determining or having determined or obtaining, by the one or more computers, for each of more than one of the client accounts, a fee tier for the respective client account; (4) dividing, by the one or more computers, the available overall program fee amount among a plurality of tiers, based at least in part, on a total of client account funds in the respective tier, to obtain a respective tier fee amount for each of the respective tiers; (5) determining or having determined or obtaining, by the one or more computers, for each of more than one of the client accounts, a respective client account fee based at least in part on the fee tier for the respective client account; (6) determining or having determined or accessing, by the one or more computers, client account interest for each of the more than one of respective client accounts, based at least in part, on the respective fund balance of the respective client account and based at least in part, on the client account fee for the respective client account; and (7) updating, by the one or more computers, the one or more databases with information relating to the interest for one or more of the client accounts, wherein at least one of the one or more aggregated accounts holds funds of client accounts in different fee tiers.

In another embodiment, a method is disclosed, comprising: (1) accessing, by one or more computers, one or more electronic databases, stored on one or more computer-readable media, comprising: aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the aggregated deposit accounts held in the deposit institutions in the program, where the client account represents funds of the respective client held in one or more of the aggregated deposit accounts; and client account information for each of more than one of the respective client accounts comprising: (a) a respective fund balance in the respective client account; and (b) a respective amount, $A_{ni}$, of the fund balance of the respective client account held in each of the one or more of the aggregated deposit accounts holding funds of the client account; (2) determining or having determined or accessing, by the one or more computers, a fee tier from among a plurality of fee tiers for the respective client account; (3) allocating, by the one or more computers, funds of the client accounts to one or more of the aggregated deposit accounts based on one or more criteria, wherein some of the client accounts in a plurality of different fee tiers are allocated to the same aggregated deposit account; (4) determining or having determined, by the one or more computers, a total interest amount for the respective client account for a period, based, at least in part, on interest earned by the one or more amounts, $A_{ni}$, of the respective client account held in each of the one or more aggregated deposit accounts holding funds of the respective client account; (5) calculating or having calculated or obtaining, by the one or more computers, a fee amount for the respective client account, based at least in part, on the fee tier for the respective client account; (6) determining or having determined, by the one or more computers, a client account interest so that the fee amount for the respective client account and the client account interest substantially equal the total interest amount for the respective client account; and (7) updating, by the one or more computers, the respective fund balance for the respective client account in the one or more databases based at least in part on the client account interest.

DETAILED DESCRIPTION OF PREFERRED EMBODIMENTS

Figure 1:
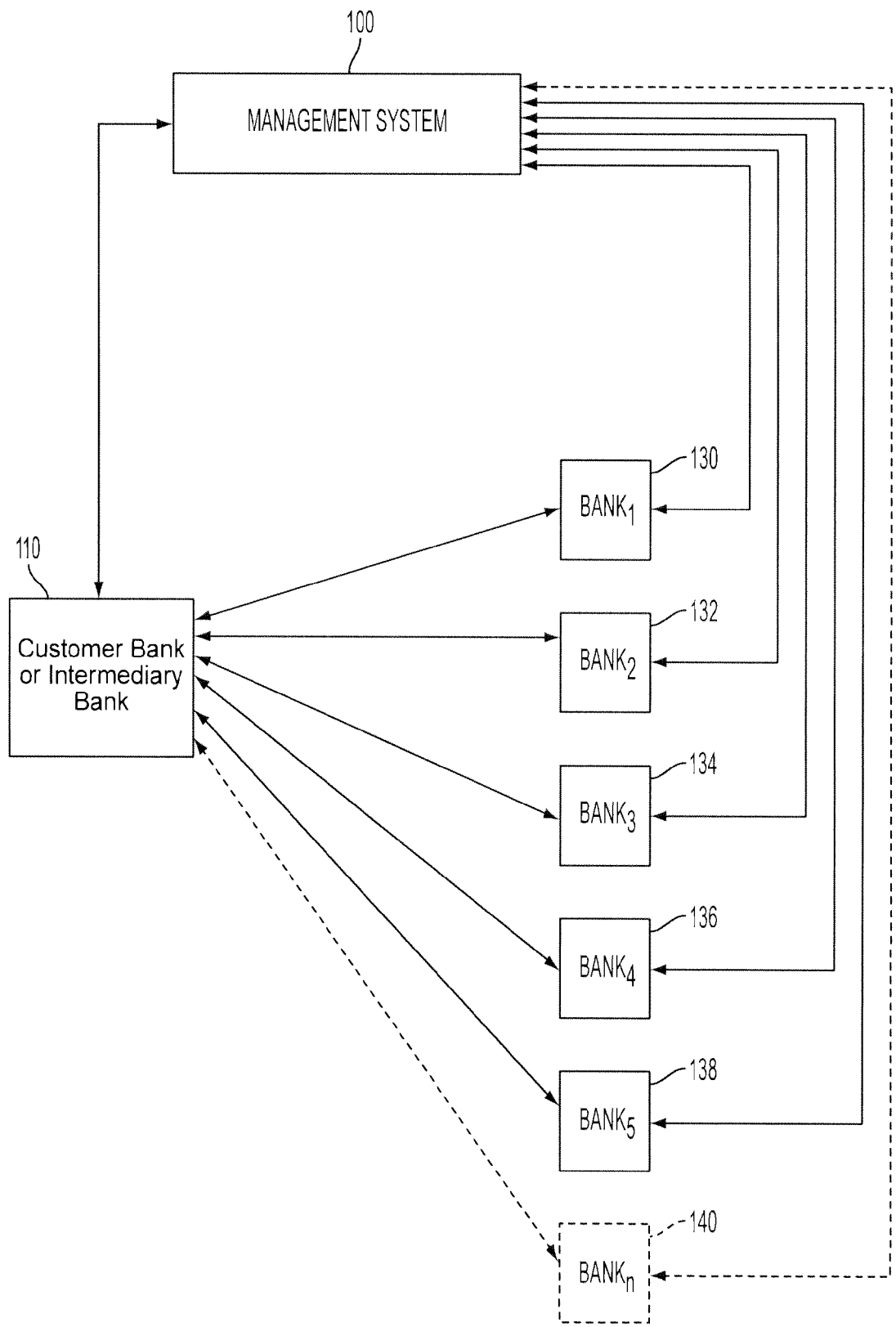
FIG. 1 is schematic block diagram of one embodiment.

FIG. 1 discloses an embodiment of the invention, comprising a financial entity, and/or a management system 100 acting as agent for the financial entity, that manages (but may or may not own) one or more aggregated interest-bearing deposit accounts held in each of a plurality of program deposit institutions, 130-140, and may also manage other financial products. In one embodiment, these one or more aggregated interest-bearing deposit accounts are insured (for example, with government-backed insurance such as Federal Deposit Insurance Corporation (FDIC)-insurance or National Credit Union Share Insurance Fund (NCUSIF) insurance), interest-bearing aggregated deposit accounts. Other embodiments for these deposit accounts are discussed below.

The financial entity or management system 100 receives various client account files. In some embodiments, the client account files comprise only deposits and withdrawals made on behalf of the respective clients resulting from investment decisions for investments such as 401K plans, 403B plans, pension plans, and other defined benefit plans. The system may cause deposit to, or withdrawal from, the aggregated deposit accounts on a per item basis, or an aggregation or net on a per client basis, or an aggregation of item data for a plurality of client accounts.

In some embodiments, the files may be data comprising client "sweep" files comprised of client deposits and withdrawals, which may comprise transactions initiated via ACH, wire, credit card, debit card, check, and/or other method of money movement, and nets of such items, and may include transactions based on client investment decisions. These files may be received from various payment serving entities, such as credit card companies and check processing companies. As noted, the system may cause deposit to, or withdrawal from, the aggregated deposit accounts on a per item basis, or an aggregation on a per client basis, or an aggregation of item data for a plurality of client accounts.

For embodiments where the system 100 aggregates deposit data and withdrawal data for a plurality of client accounts, the aggregation in one embodiment may be of data received over a sub-period of time, e.g., one or more hours, or a day or an ad hoc amount of time, for example, of a period of time, e.g., a month, for example. If the aggregated deposits of all or a select group of client accounts for that financial entity exceed the aggregated client withdrawals (e.g., a net credit) during this period of time, then all or some of the funds may be deposited in the aggregated deposit accounts in the one or more program deposit institutions. Conversely, if client withdrawals for all or a select group of client accounts of that financial entity or program exceed client deposits (e.g., a net debit) during this period of time, then one or more of the program deposit institutions may be instructed electronically, or by messenger, or other convenient or appropriate method, as described below, to withdraw funds from one or more of the aggregated deposit accounts, for subsequent satisfaction of the net withdrawal. The management system 100 generates instructions to initiate transfers of these funds to or from the different program deposit institutions 130-140. The transfers may be based on various rules. As noted above, in one embodiment, the deposits and withdrawals made on behalf of the respective client may result from client decisions on investment only. In another embodiment, the deposits and withdrawals made on behalf of the respective client may result from client decisions on both investment and from credit card, debit card, check or other client payment transactions.

In one or more embodiments to be discussed below, a fee is determined for each of one or more respective amounts, $A_{ni}$, of the client account funds held in one or more aggregated deposit accounts at the respective program deposit institutions $n_i$. An embodiment of this fee determination will be discussed in relation to FIGS. 3A and 3B below. However, an embodiment of a program allocation process, shown in FIGS. 1 and 5, is first described to provide context for the fee determination embodiments.

Figure 4:
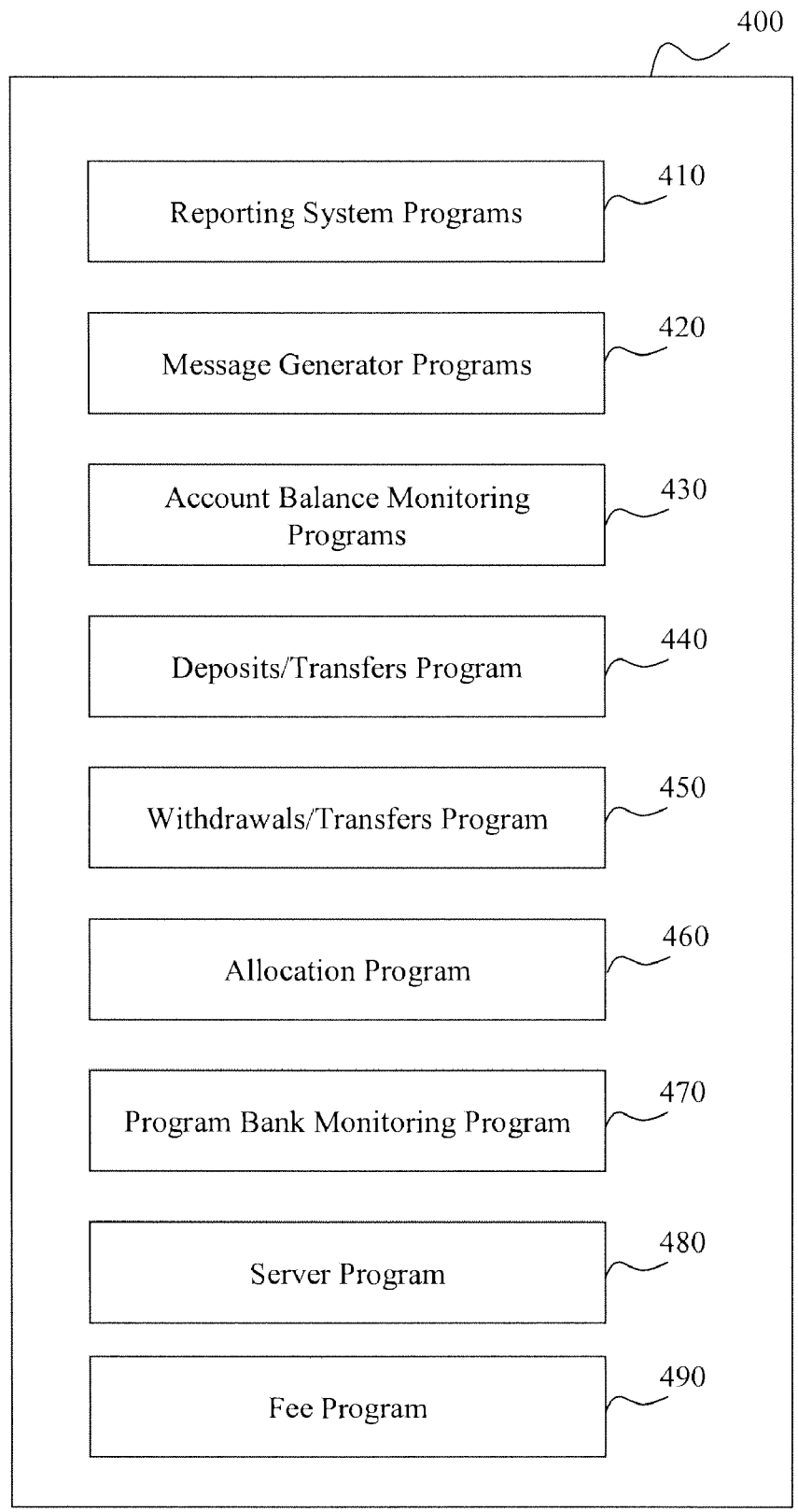
FIG. 4 is schematic block diagram of an embodiment of a memory configuration that may be used to implement the present invention.
Figure 5:
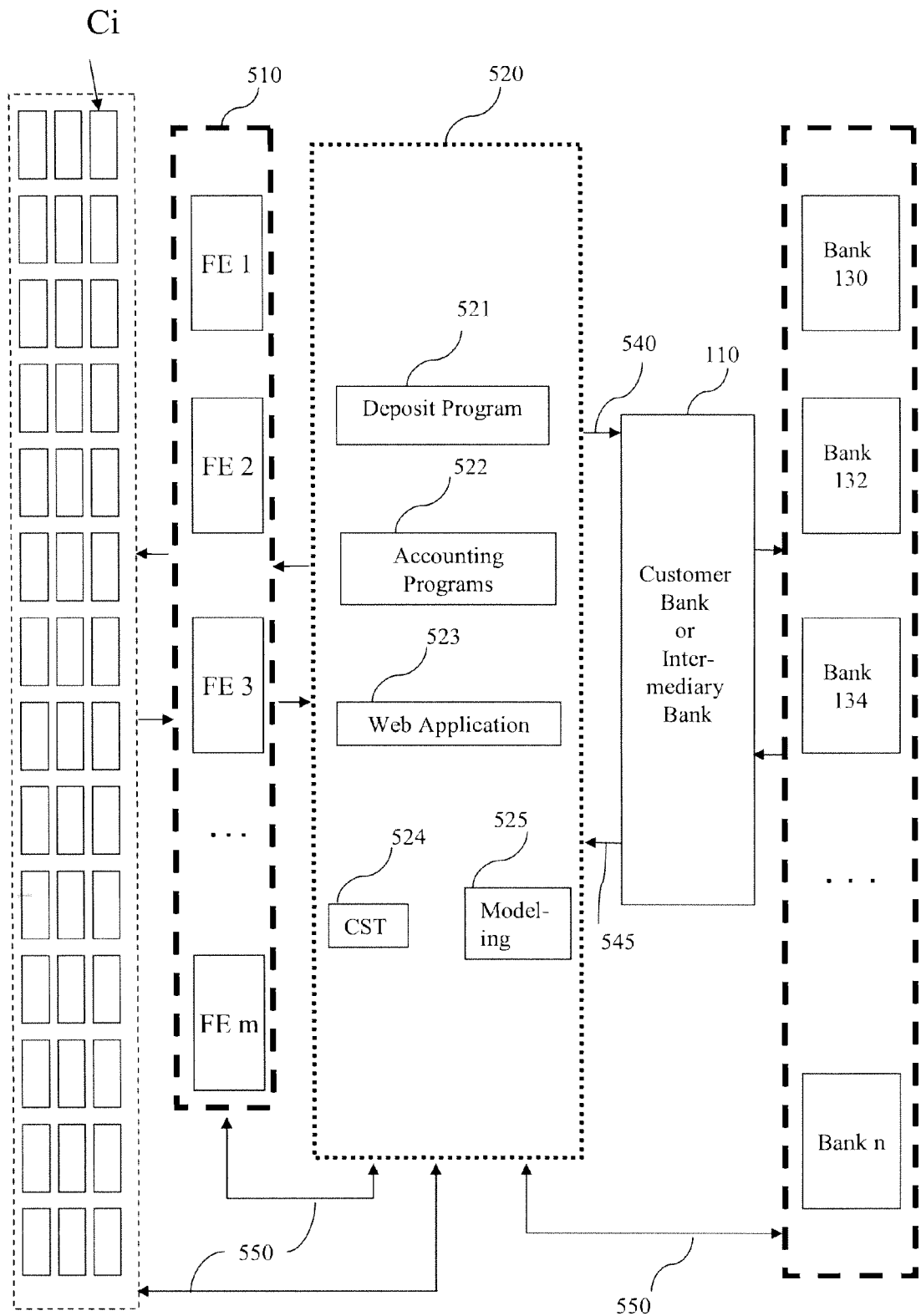
FIG. 5 is schematic block diagram of one embodiment.

FIG. 5 illustrates one embodiment of a system consistent with the present invention. The individual clients are represented in the figure by the small blocks $C_i$. The respective clients, $C_i$, may comprise individual investors and/or institutional investors. One or more source deposit institutions and/or source broker dealers and/or other source financial entities, FE 1, FE 2, FE 3, and FE m, represented in block 510, may maintain a relationship with these clients, $C_i$, and maintain client accounts, i, for these clients. The management system 100 and its one or more computers are represented in FIG. 5 by block 520. The management system 520 is configured by a fund allocation computer program 521, and an accounting computer program 522 that maintains information on the client accounts and the program deposit institutions, and the movement of funds, in one or more databases. In one embodiment, this accounting program 522 provides individual investor accounting functions, sweep functions, sweep processing and billing. The management system 520 may further comprise one or more web application programs 523. The management system 520 may further comprise, in one embodiment, one or more computer programs 524 for processing and generating combined statements, including monthly, year end and tax statements, broker dealer or other financial entity administrative functions, deposit institution reconciliation processing, and client inquiry processing. The management system 520 may further comprise, in one embodiment, a modeling program 525, for predicting a program deposit institution capacity for receiving funds based on one or more criteria. Other computer programs run by the management system are referenced in FIG. 4, to be discussed below.

FIG. 5 further represents the customer deposit institution or intermediary deposit institution 110 of FIG. 1 that holds one or more control operating accounts. Also shown are a plurality of program deposit institutions 130, 132, 134 . . . n. In one embodiment, deposits to and withdrawals from the client accounts, are netted and transferred to or from the one or more control operating accounts maintained in the customer or intermediary deposit institution 110. The computers of the management system 520 then allocate deposits to or withdrawals from one or more of the program deposit institutions and send information and/or instructions to have the funds transferred to or withdrawn from one or more of the program deposit institutions. The arrowed lines 540 and 545 represent the movement of funds to and from the various entities shown in the figure. The arrowed lines 550 represent transmission of information on the movement of the funds, including the amount transferred, the timing of the movement, and the interest rate.

Note that the management system 100 may receive the client transaction files from or associated with a given source relationship deposit institution or other source relationship financial entity that can hold funds. A source relationship deposit institution or other source financial entity comprises a deposit institution or other financial entity that has records of the client account in the name of and for the benefit of the respective client. The client account represents funds of the client managed by the management system. The client may have opened a client account with the deposit institution or other financial entity, and may make deposits at a branch office of the deposit institution or other financial entity. An amount from the client account may be held in one or more aggregated deposit accounts in the relationship deposit institution, before amounts are allocated to aggregated deposit institutions in other program deposit institutions. This amount retained in the source deposit institution can be as much or as little as desired. The amount to be retained may be, but need not be set in relation to an FDIC insurance limit. The amount to be retained may be substantially more than the FDIC insurance limit, or it may be an amount needed to satisfy day-to-day transactions based on historical transaction data for the respective client account, or it may be a generic average generated from historical transaction data from a plurality of client accounts, for example.

Referring again to FIG. 1, in one embodiment, the net transfer to or from one or more of the program deposit institutions may be from one or more control operating accounts 110 held in the financial entity having the client relationship, e.g., a financial entity that is a deposit institution. In another embodiment, the one or more control operating accounts for the transfer may be held in a deposit institution controlled by or associated in some manner with the administrator of the management system 100. In another embodiment, the one or more control operating accounts may be held in or on behalf of a deposit interchange entity that operates to distribute deposits across multiple deposit institutions.

In one embodiment, one of the program deposit institutions 130-140 could be the same deposit institution that maintains a relationship with the clients. Alternatively, one or more of the program deposit institutions may be affiliated with the deposit institution or other financial entity maintaining the relationship with the clients. Alternatively, one or more of the program deposit institutions may be affiliated with the deposit institution maintaining the client relationship, and one or more of the program deposit institutions may be non-affiliated with respect to the deposit institution or other financial entity maintaining the relationship with the clients. Alternatively, none of the program deposit institutions may be affiliated with a deposit institution or other financial entity maintaining the relationship with the clients.

In one embodiment the aggregated deposit accounts in which the managed balances for clients are deposited are simply interest-bearing, aggregated deposit accounts. In another embodiment, the aggregated deposit accounts in which the managed balances for clients are deposited are interest-bearing, insured (such as, for example, with government-backed insurance like Federal Deposit Insurance Corporation (FDIC)-insurance or National Credit Union Share Insurance Fund (NCUSIF) insurance), aggregated deposit accounts, such as MMDAs. Alternatively, the aggregated deposit accounts may be aggregated DDAs, such as a NOW accounts, that permits an unlimited number of deposits and withdrawals. Alternatively, the aggregated deposit accounts may be other types of investment vehicles, such as by way of example, a money market fund. In one embodiment, an MMDA is paired with an aggregated DDA, and both accounts are held in the identical name of the financial entity, or its agent. This paired set of accounts is referred to herein as an "MMDA-DDA pair." The DDA's serve to facilitate the exchange of funds between the MMDAs, the financial entities, and sources of client transactions.

The transfer of funds may be accomplished in a variety of different manners, using a variety of different transfer algorithms or methods. In one embodiment, if the financial entity or the management system 100 determines that it is necessary to withdraw and/or transfer funds from a particular MMDA at a particular program deposit institution, it may first generate an instruction for the withdrawal and cause that instruction to be sent by messenger, mail, telephone (via check mailed to the depositor), automated teller machine, or in person, to the program deposit institution. See Title 12 code of Federal Regulations, Part 329, Sections 1(b)(3), 2 and 101 (12 CFR 329.1-101). Other methods may also be used, but the use of such methods would be subject to the withdrawal limits imposed by this section. In one implementation of this embodiment, funds could be transferred from the MMDA to the DDA member of the MMDA-DDA pair, and then, the funds in the DDA could be moved to the financial entity's or its agent's own account or accounts. Alternatively, in some embodiments the instructions for withdrawal may be sent by wire. In some embodiments the funds may be moved to a control operating account at an intermediary deposit institution, prior to moving the funds to the financial entity's own account. The control operating account 110 may be registered in the name of the agent or administrator of the management system for the exclusive benefits of its deposit customers. Funds from this account may be further transferred to a third party, such as a transaction source or a source financial entity (preferably by electronic or other automatic means). A database is updated to reflect these funds transfers. Alternatively, if funds are to be deposited and/or transferred into a particular MMDA, the agent or management system 100 either may have the funds deposited into the associated DDA and then moved into the MMDA for the program, or may have the funds deposited directly into the MMDA.

In some embodiments, an MMDA-DDA pair may be used, where a balance of funds is maintained in the DDA part of the pair so as to minimize the number of withdrawals that may be necessary from the MMDA during a reporting cycle.

In some embodiments, in order to avoid a withdrawal limit imposed by regulation on interest-bearing deposit accounts, a program rule may be implemented to monitor the number of withdrawals from the interest-bearing aggregated deposit account, and when it reaches a predetermined withdrawal limit, e.g., one less than the regulation withdrawal limit for a period, such as 5 withdrawals, then a final withdrawal of all or a large amount of the funds may be made, and the funds transferred to a different aggregated account at a different deposit institution, that has not reached this predetermined withdrawal limit. Alternatively, the funds could be transferred for the remainder of the reporting cycle to a DDA or other account in the same deposit institution which does not have a limit on the number of withdrawals available.

While in a preferred embodiment, a separate account or set of accounts, e.g., money market deposit account (MMDA) and demand deposit account (DDA), may be set up by the system administrator computers 100 for each program with each different source financial entity (e.g., broker dealer) in each of the program deposit institutions, under certain embodiments of the present invention, funds from different programs of the same source financial entity or different source financial entities may be commingled and aggregated. Thus, in one embodiment, each broker dealer (an example of a financial entity) can establish a separate program with the administrator computers 100 to allocate funds from its respective client accounts into separate aggregated accounts designated for that source broker dealer in a plurality of program aggregated deposit institutions. In another embodiment, the funds from client accounts of a plurality of broker dealers can be aggregated into the same set of aggregated deposit accounts in the plurality of program deposit institutions. Thus, the administrator computer does not have to set up a separate money market deposit account (MMDA) and associated demand deposit account (DDA) for each program with each source financial entity at the program deposit institution, e.g., the same MMDA and/or DDA can be used across several programs. Accordingly, a single aggregated MMDA or other type of account can be set up at each program deposit institution, or multiple aggregated MMDA accounts can be set up at each program deposit institution. Additionally, embodiments of the system may be set up without DDA accounts. Alternatively, where the clients may be limited to certain types of entities, the DDA could be a NOW account, or a NOW account could be used in place of one or more of the MMDAs. In either instance, the NOW account would be an aggregated deposit account holding funds of a plurality of clients.

In some embodiments, a management system 100 may maintain account information for each of the source financial entities and others in a database within its own system, or access such a database maintained by a third party. The management system 100 periodically may report balances and other data with respect to the client accounts and amounts distributed to the aggregated deposit accounts, to the program deposit institutions, and/or to the originating source deposit institution or source broker-dealer or other source financial entity that maintains the client relationship, and/or to the clients themselves.

In one or more embodiments, a deposit institution allocation process then operates electronically to allocate fund amounts to the program deposit institutions based on various rules, such as fitting within maximum deposit institution caps, and/or minimum deposit institution caps, and/or based on a determined tier for a given client account, that may be determined based on one or more criteria or based on reciprocity rules.

In an embodiment of the invention, a computer system, computer implemented method, and program product are disclosed for managing a plurality of client accounts associated with a plurality of respective clients, and determining, or having determined, fees to be posted or otherwise assessed against the funds of the respective client account managed by the management system 100.

Figure 3A:
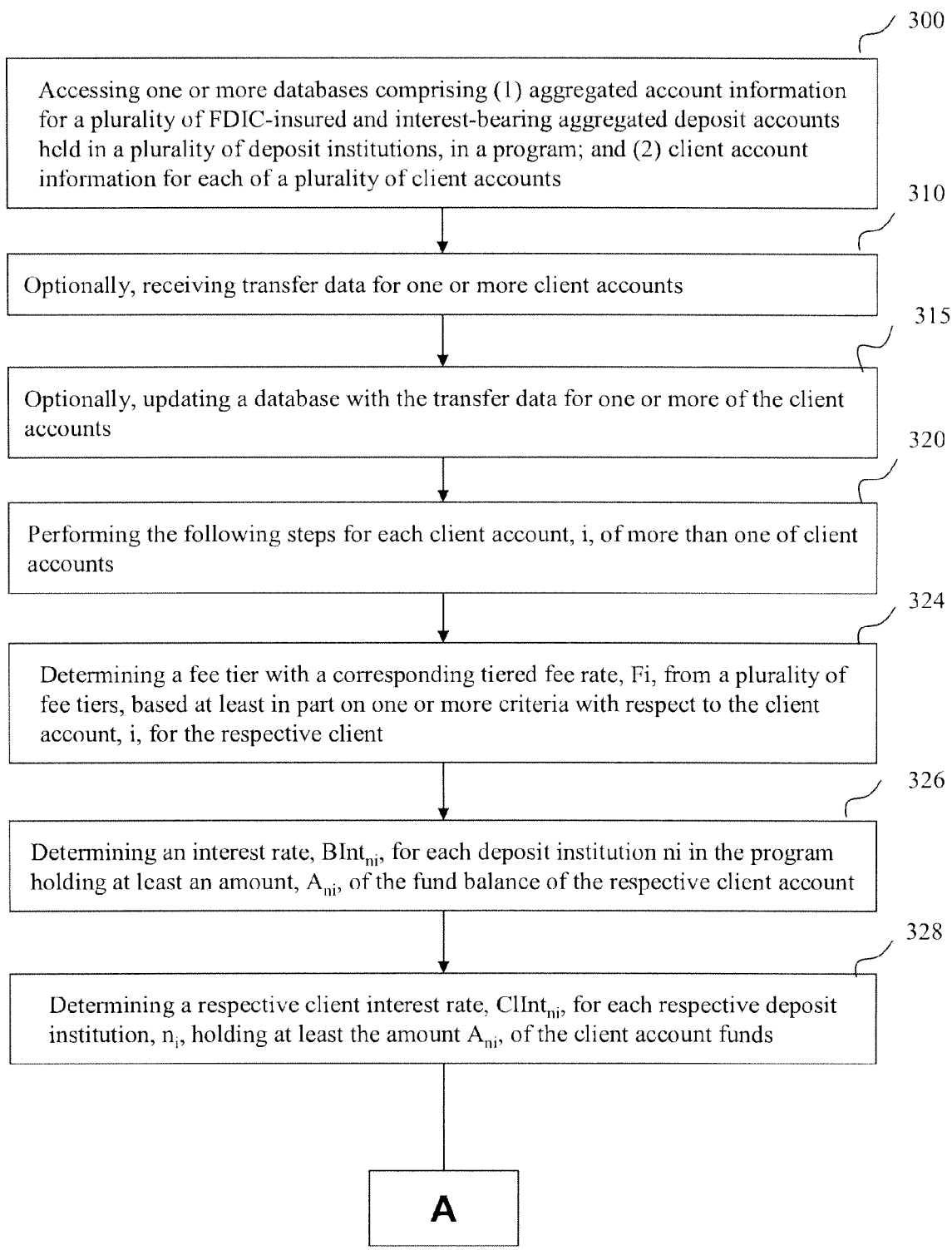
FIG. 3A is schematic block diagram of a further embodiment.
Figure 3B:
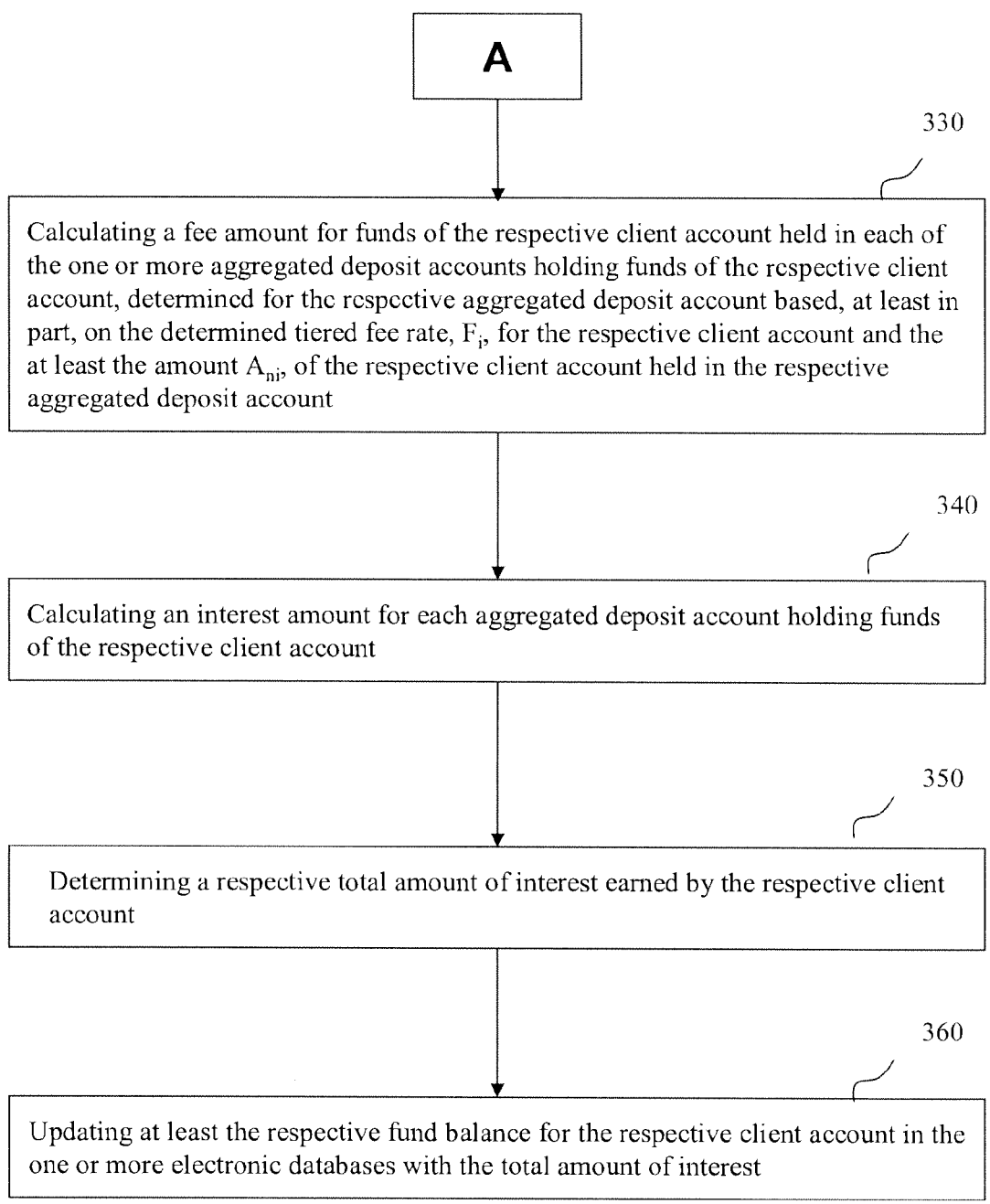
FIG. 3B continuation of the schematic block diagram of FIG. 3A.

Referring to FIGS. 3A and 3B, one embodiment of a computer-implemented method is disclosed. Block 300 comprises a computer-implemented operation of accessing, by one of more computers, in the performance of one or more of the following steps, one or more electronic databases, stored on one or more computer-readable media, with the one or more databases comprising: (1) aggregated account information for a plurality of Federal Deposit Insurance Corporation (FDIC)-insured and interest-bearing aggregated deposit accounts held in a plurality of deposit institutions, N, in the program, wherein funds from client accounts of a plurality of clients are aggregated with funds of other client accounts in the aggregated deposit accounts held in the deposit institutions in the program; and (2) client account information for each of a plurality of the respective client accounts comprising: (a) a respective fund balance in the respective client account, i.e., the amount of the client funds in the program; (b) optionally, transfer data for the respective client account (which is to be interpreted broadly to comprise the movement of funds for investment accounts, or payment sources, to name a few); and (c) a respective amount, $A_{ni}$, of the fund balance of the respective client account held in the one or more of the aggregated deposit accounts in the deposit institutions holding funds of the client account. The client records also preferably store information representing basic client identifications, such as name, address, social security number, and the like, information representing the source financial entity association, such as a client account number at the financial entity, client characteristics at the financial entity important to management, and the like, and additional client related information.

Block 310 comprises an optional computer-implemented operation of receiving, by the one or more computers, data for one or more deposits/transfers for one or more of said client accounts and/or data for one or more withdrawals/transfers from one or more of said client accounts. Note that this data may comprise data for individual transactions (checks, debit card transactions, credit card transactions, ACH transfers, deposits, to name a few) or a net of transactions for a given client for a time period, such as a net of sweep data for a client account, or a net of transactions of a plurality of accounts of different clients. In a further embodiment, the optional operation of administering, by the one of more computers, clients' deposits/transfers to and withdrawals/transfers from each of the client accounts, comprises processing data for one or more deposits/transfers for one or more client accounts and/or data for one or more withdrawals/transfers from one or more client accounts. In one embodiment, this transfer data may comprise a respective amount for each respective deposit/transfer and each respective withdrawal/transfer or nets for one client or a plurality of clients. As noted above, this data may comprise transfers in relation to investment accounts such as 401K plans and pension plans, and/or payment data from payment servicers such as credit card and debit card processors, and check processors, and direct withdrawal and deposit transactions with the client, and may be individual items or a net of items. In one embodiment, the administering comprises processing withdrawal/transfer amounts netted from payment services, such as credit card services, debit card services, to name a few.

Block 315 comprises an optional computer-implemented operation of updating, by the one or more computers, the one or more electronic databases with the data for one or more of the client accounts, comprising for a respective one of the client accounts with data, updating: (i) the respective fund balance of the respective client account; and (ii) the respective amount, $A_{ni}$, of the fund balance of the client account held in one or more aggregated deposit accounts at least one of the one or more deposit institutions holding funds of the respective client account.

Block 320 comprises a computer-implemented operation of performing, by the one of more computers, the following steps 324, 326, 328, 330, 340, and 350 for each client account, i, of a plurality of the client accounts.

Block 324 comprises a computer-implemented operation of determining, by the one of more computers, a fee tier with a corresponding tiered fee rate, $F_i$, from a plurality of fee tiers, for client account, i, based at least in part on one or more criteria. In one embodiment, one of the one or more criteria may comprise a level of the client fund balance in relation to tier ranges set forth in a tier table, e.g., a total amount from the client account held by or to be deposited in the aggregated deposit accounts in the program deposit institutions, in relation to tier ranges set forth in a tier table. In one embodiment, the client account comprises funds of the client held in the program deposit institutions and also funds of the client held in other program investments vehicles, and the fund balance is the total of client funds held in the aggregated deposit accounts and in other program investment vehicles. In another embodiment, the client account consists of funds of the client held only in the aggregated deposit accounts of the program, and the fund balance is a balance of funds of the client held in the program in one or more of the deposit institutions in one or more aggregated deposit accounts therein.

In one embodiment, one of the one or more criteria may comprise meeting one or more relationship requirements for the client account in the one or more databases. For example, the relationship information may comprise a number of years the client has been associated with a given entity, such as a source relationship deposit institution or source broker dealer or other source financial entity holding the client account. In another embodiment, a relationship criterion may comprise a sum of respective amount(s) in one or more respective accounts of the client or the client and his family held in aggregated deposit accounts in the program in relation to a set of ranges in a tier table. In another embodiment, a relationship criterion may comprise a sum of respective amounts in one or more respective accounts of the client or the client and his family held with a source financial entity, such as a broker dealer, or bank, whether or not all of the funds are managed by the program. Alternatively, the relationship information may comprise a total amount of funds held by a source relationship entity, such as the deposit institution or broker dealer or other financial entity holding the client account, comprising funds of all of the different clients of the deposit institution or broker dealer or other financial entity held in the program with the management system. A variety of other relationships and combinations of the above may be used to determine a fee tier.

The one or more databases may comprise fee tier information comprising a plurality of fee tiers, each fee tier with a corresponding tiered fee rate, $F_i$.

In one embodiment as noted above, each of the plurality of fee tiers comprises a uniform tiered fee rate, $F_i$, to be applied to the respective client fund balances that are within a predetermined monetary range set forth in the tier. In a further embodiment, each of a plurality of the tiers may comprise a more complex algorithm to be applied to a client fund balance to determine a tiered fee rate, $F_i$. For example, an algorithm may comprise a tiered fee rate, $F_i$, to be applied to the respective amounts of the client fund balance held in the different deposit institutions in the program, plus a respective fixed amount to be added to or subtracted from this calculation if certain criteria are met. In a yet further embodiment, the tiered fee rate, $F_i$, or an algorithm is selected in a tier algorithm table, based in part on profile information stored in the one or more electronic databases. In a yet further embodiment, the uniform tiered fee rate, $F_i$, is a flat fee applied to the client fund balance.

Block 326 comprises a computer-implemented operation of determining, by the one of more computers, a deposit institution interest rate, $BInt_{ni}$ for a period of time, for each deposit institution in the program, $n_i$, holding or to hold in their one or more aggregated deposit accounts amount(s) of funds, $A_{ni}$, of the client fund balance of the respective client account, i. In one embodiment, this operation may comprise receiving data from a deposit institution, or the administrator, or another source, on the interest for the respective deposit institution. In another embodiment, this operation may comprise calculating the interest rate for the respective deposit institution based on one or more criteria. For example, one criterion may comprise a total amount held in one or more aggregated accounts held in the deposit institution for the program. This total amount held by the program in the deposit institution may fluctuate from period to period, thereby causing the interest rate for the aggregated deposit account in deposit institution to fluctuate.

Block 328 comprises a computer-implemented operation of determining, by the one of more computers, a respective client interest rate, $CIInt_{ni}$, for each respective program deposit institution, $n_i$, holding at least an amount of the funds, $A_{ni}$, of the client fund balance of the respective client account, i, wherein the client interest rate, $CIInt_{ni}$, for the amount of funds, $A_{ni}$, of the fund balance, held in the respective deposit institution, $n_i$, is determined, in one embodiment, by at least subtracting the tiered fee rate, $F_i$, from the deposit institution interest rate, $BInt_n$, for the respective deposit institution $n_i$, or otherwise performing a mathematical computation so that the tiered fee rate and the client interest rate equals the deposit institution interest rate, $BInt_n$. In one embodiment, an amount of the tiered fee rate, $F_i$, may be waived, based on one or more criteria. For example, one criterion may comprise a comparison of a level of deposit market rate for deposits, in the area, or on the Internet, or some other area, for that period, to the resulting computed client interest rate.

Block 330 comprises a computer-implemented operation of calculating, by the one of more computers, a fee amount for funds of the respective client account, i, held in each of the one or more aggregated deposit accounts holding an amount of the fund balance of the respective client account, i, with the fee amount determined for the respective aggregated deposit account, based, at least in part, on the determined tiered fee rate, $F_i$, for the respective client account and the at least the amount of funds, $A_{ni}$, of the fund balance of the respective client account held in the respective aggregated deposit accounts. Note that in one embodiment, the fee tier may comprise a more complex algorithm that determines the tiered fee rate, $F_i$. For example, a different fee or a same fixed fee may be added to or subtracted from the result of a calculation of the amount of funds, $A_{ni}$, of the respective client account held in the aggregated deposit account multiplied by the tiered fee rate, $F_i$. As noted above, an amount of the tiered fee rate, $F_i$, may be waived, based on one or more criteria, and this may be factored into the calculation. Embodiments implementing such waiver operation will be described below.

Block 340 comprises a computer-implemented operation of calculating, by the one of more computers, an interest amount for each aggregated deposit account holding an amount of the fund balance of the respective client account, i, wherein the interest amount for funds of the respective client account held in the respective program aggregated deposit account, is determined based, at least in part, on the determined client interest rate, $CIInt_{ni}$ and the at least the amount of funds, $A_{ni}$, of the client fund balance of the respective client account held in the respective aggregated deposit account. Note that in one embodiment, a more complex algorithm may be used that comprises the client interest rate, $CIInt_{ni}$, to calculate the interest amount. For example, a different or the same amount may be added to or subtracted from the result of a calculation based on the amount of funds, $A_{ni}$, of the respective client account held in the program aggregated deposit account, and client interest rate, $CIInt_{ni}$.

Block 350 comprises a computer-implemented operation of determining, by the one of more computers, a respective total amount of interest for the respective client account, i, comprising at least summing the interest amounts of the aggregated deposit account, holding an amount, $A_{ni}$, of the fund balance of the respective client account, i. In one embodiment, a more complex algorithm may be used to determine the total amount of interest for the respective client account i. In one example, a fixed amount or a variable amount may be added or subtracted from the result of summed interest amounts from the respective program aggregated deposit accounts holding funds of the respective client account.

Block 360 comprises a computer-implemented operation of updating, by the one of more computers, the respective fund balance for the respective client account in the one or more electronic databases with this total amount of interest. This updating operation may be performed for one or more of the client accounts, i. Other information may also be contained in the database, describing the client funds being managed.

In a further embodiment, a computer-implemented operation is provided of summing, by the one or more computers, a total amount of fees due for a respective client account, i, by summing the one or more fee amounts determined for the respective client account i in block 330. Note that in one embodiment, a more complex algorithm may be used that comprises the summing operation to determine the total fee for the client account. For example, a different or the same fixed fee may be added to or subtracted from the result of summed fee amounts determined for the respective client account i in block 330.

An example is presented below of the operation of an embodiment where the fee may be assessed based on a client fund balance, held in a respective client account, i, that is allocated to one or more aggregated, interest-bearing deposit accounts in the program deposit institutions. The fee may be assessed based on a tiered fee structure. As discussed in detail below, the tiered fee structure may comprise a plurality of fee tiers, wherein each fee tier within the fee tier structure may comprise a monetary range and a tiered fee rate, $F_i$, for the particular fee tier. The tiered fee rate, $F_i$, for each tier may be assessed on each client account, i, that has a client fund balance, falling within the monetary range specified for the particular fee tier. Table I below illustrates an exemplary embodiment of a tiered fee structure.

TABLE I

| Fee Tier | Client Deposit Amount (Di) | Tiered Fee Rate ($F_i$) |
|---|---|---|
| A | $10,000,000.01+ | 0.1% |
| B | $5,000,000.01-$10,000,000.01 | 0.3% |
| C | $1,000,000.01-$5,000,000.00 | 0.5% |
| D | $500,000.01-$1,000,000.00 | 0.7% |
| E | $100,000.01-$500,000.00 | 0.9% |
| F | $00.00-$100,000.00 | 1.1% |

In this embodiment, regardless of the method used to determine the fee, the same fee rate is charged to the client in every program aggregated deposit account holding the client's funds, regardless of the amount held for the client account, i, in a respective aggregated deposit account in a deposit institution in the program. Likewise, the same fee rate is charged to all client accounts, i, that have a client fund balance within the monetary range of the particular tier. For example, a client account, i, with a client fund balance, of $110,000.00 will be charged at the same fee rate of 0.9% as a similar client account, i, with a client fund balance, of $490,000.00, based on the tiered fee structure set forth in Table I. Similarly, a client account, i, with a client fund balance of $6,000,000.00 will be charged at the same fee rate of 0.3% as a similar client account, i, with a client fund balance of $9,000,000.00, based on the tiered fee structure set forth in Table I, regardless of which of the aggregated deposit accounts and program deposit institutions 130-140 are holding funds of the respective client account and in what amounts. Note that in one embodiment of the program, the inventive system and method may be used in a defined benefit program or pension benefit program, and in one embodiment, may be coupled with a loan program. A fee amount for participating in the loan program, in one embodiment, may also vary in the same way using tiering.

As noted previously, the fee amount is not limited to a calculation based solely on the tiered fee rate, $F_i$, determined for the client account. A more complex algorithm may be assigned to each tier, which may differ from tier to tier. For example, the fee amount for a particular tier may be a combination of a flat fee and a rate, e.g., $50.00+2% for a first tier, $25+1% for a second tier, etc.

Furthermore, it should be appreciated that each fee tier in a fee tier structure does not have to follow the same fee determination method. For example, some fee tiers may be based on a fixed rate, while other fee tiers may be based on an algorithm comprising a fixed rate and some additional calculation such as an addition of a flat rate. Table II shows an exemplary embodiment of a tiered fee structure that provides different fee determination methods for each tier.

TABLE II

| Fee Tier | Client Deposit Amount, $D_i$, | Tiered Fee/year |
|---|---|---|
| A | $10,000,000.01+ | $6,000.00 |
| B | $5,000,000.01-$10,000,000.01 | $6,500.00 |
| C | $1,000,000.01-$5,000,000.00 | $3,000.00 |
| D | $500,000.01-$1,000,000.00 | $1,000.00 + 2.2% |
| E | $100,000.01-$500,000.00 | $3,000.00 + 2.4% |
| F | $00.00-$100,000.00 | 3.0% |

From the above, it can be seen that the above described calculations of FIGS. 3A and 3B, apply to some of the client accounts with client fund balance that qualify for certain tiers, but not to others. For example, in Table II, the calculations described in FIGS. 3A and 3B would be applied to tiers D, E and F. A flat fee is applicable to tiers A, B, and C.

The tiered fee rate, $F_i$, may also be based in whole or in part on profile information associated with the client account, i. The profile information may include, but not be limited to, the status of the client, the number of years the client has been associated with one or more financial institutions, the average daily fund balance in the client account, the type of account (business, personal, family, etc.), a number of accounts the client has in one or more source financial institutions, the average deposits/withdrawals amounts, the frequency of deposits/withdrawals, the credit score of the client, as well as parameters related to the source deposit institution, source broker dealer, or other source financial entity holding the relationship with the client. The profile information may be stored and obtained from the one or more databases associated with the management system 100, the program deposit institutions 130-140, and/or the customer or intermediary deposit institution 110. If the profile information stored in the one or more databases for the client account meet one of these profile criteria, then the tier rate is determined accordingly.

Table III illustrates an exemplary embodiment of a tiered fee structure that takes into consideration profile information. In particular, Table III shows an exemplary embodiment of a tiered fee structure that provides different tiered fee rates, $F_i$, based, in part, on a number of years a client account has been associated with a given source financial entity and in part, on the client fund balance. As illustrated, some clients may be assessed no fee due to a long standing relationship with the financial entity, and/or based on a particular client fund balance.

TABLE III

| Fee Tier | Client Deposit Amount, $D_i$, | Standard Tiered Fee Rate ($F_i$) | 5+ Yr. Acct. Tiered Fee Rate ($F_i$) | 15+ Yr. Acct. Tiered Fee Rate ($F_i$) |
|---|---|---|---|---|
| A | $10,000,000.01+ | 0.1% | 0.05% | 0.00% |
| B | $5,000,000.01-$10,000,000.01 | 0.3% | 0.2% | 0.1% |
| C | $1,000,000.01-$5,000,000.00 | 0.5% | 0.3% | 0.2% |
| D | $500,000.01-$1,000,000.00 | 0.7% | 0.5% | 0.3% |
| E | $100,000.01-$500,000.00 | 0.9% | 0.7% | 0.5% |
| F | $00.00-$100,000.00 | $2,000.00 | $1,600.00 | $1,000.00 |

In some embodiments, the tiered fee structure may increase or decrease in a linear manner. In other embodiments, the tiered fee structure may not increase or decrease in a linear manner. Thus, a substantial increase or decrease in fees may be attained by classification in a higher or lower fee tier.

Table IV shows an alternative embodiment of a tiered fee structure, wherein a flat monetary fee is specified for each fee tier.

TABLE IV

| Fee Tier | Client Deposit Amount, Di, | Tiered Fee |
|---|---|---|
| A | $10,000,000.01+ | $1,500.00 |
| B | $5,000,000.01-$10,000,000.01 | $1,200.00 |
| C | $1,000,000.01-$5,000,000.00 | $1,400.00 |
| D | $500,000.01-$1,000,000.00 | $1,600.00 |
| E | $100,000.01-$500,000.00 | $1,600.00 |
| F | $00.00-$100,000.00 | $1,000.00 |

In this embodiment, the following steps are performed for each client account, i, of a plurality of client accounts:

(a) determining a fund balance associated with a respective client account, i, comprising funds distributed and/or to be distributed over one or more of the plurality of deposit institutions, N, in the program;

(b) determining a fee tier with a corresponding tiered flat fee, $FF_i$, from a plurality of fee tiers, based at least in part on one or more criteria with respect to the client account, i, for the respective client;

(c) determining a deposit institution interest rate, $BInt_{ni}$, for a defined period of time for each deposit institution in the program, $n_i$, holding in one or more aggregated deposit accounts an amount(s) of funds, of the client fund balance of the respective client account;

(d) calculating an interest amount for each aggregated deposit account holding funds of the respective client account, wherein the interest amount for the respective client account is determined based, at least in part, on the interest rate $BInt_{ni}$, for the respective deposit institution holding the one or more aggregated deposit accounts and the at least the amount of funds, $A_{ni}$, of the respective client account held in the respective aggregated deposit account;

(e) determining a respective total amount of interest for the respective client account, comprising at least summing the interest amounts for each of the deposit institutions, holding funds of the respective client account, i, and subtracting the fixed amount determined from the tier table for the respective client account, i, and (f) updating the one or more of the electronic databases with information for one or more of the client accounts, comprising one or more selected from the group of: (i) the fee amount for the respective client account; and (ii) the total amount of interest determined for the respective client account.

In one embodiment, each of the deposit institutions in the program may provide or negotiate a different respective interest rate $BInt_n$ for a defined period. Alternatively, all of the program deposit institutions may provide the same deposit institution interest rate, $BInt_N$, for a defined period. The funds to be allocated may be received via one or more interfaces with clients and financial entities. For example, an electronic interface, such as a web page, may be set up to receive funds from clients, and/or source broker dealers or other source financial entities, and/or source deposit institutions, and/or source Internet deposit institutions, to name a few.

An example calculation in accordance with one embodiment is now provided for a client A's client fund balance of $300,000.00. The amount allocated of the client account funds for that period in Tier E of Table I (shown again below), with a tiered fee rate, $F_i$, of 0.9%. Note that this is a per annum rate, so that a fee calculation for a month would require a division by 365, with the result of this division multiplied by the number of days in the month, or more simplistically and not quite as accurate, a division by 12, e.g., 0.009/12.

TABLE IV (Repeated)

| Fee Tier | Client Deposit Amount (Di) | Tiered Fee Rate ($F_i$) |
|---|---|---|
| A | $10,000,000.01+ | 0.1% |
| B | $5,000,000.01-$10,000,000.01 | 0.3% |
| C | $1,000,000.01-$5,000,000.00 | 0.5% |
| D | $500,000.01-$1,000,000.00 | 0.7% |
| E | $100,000.01-$500,000.00 | 0.9% |

Assume for this example calculation, that the $300,000 client fund balance is allocated evenly across three of the program deposit institutions 130, 132, and 134, i.e., $100,000 per deposit institution. For this calculation, a respective deposit institution interest rate, $BInt_n$, for the respective program deposit institutions 130, 132 and 134 holding the client account funds is shown in Table V.

TABLE V

| Deposit institution | Deposit institution Interest Rate ($BInt_N$) |
|---|---|
| 130 | 3.0% |
| 132 | 2.5% |
| 134 | 2.0% |

The block 328 determination of the client interest rate, $CIInt_{iN}$, for this example, for the amount of funds held in the respective one or more aggregated deposit accounts in the deposit institution, $n_i$, comprises the operation of subtracting (or other comparable mathematical calculation to obtain the same result) the tiered fee rate, $F_i$, from the deposit institution interest rate, $BInt_{ni}$, for the respective deposit institution $n_i$. Accordingly, as illustrated in Table VI below, the client interest rate, $CIInt_{ni}$, for program deposit institutions is determined by at least subtracting the tiered fee rate, $F_i$, of 0.9%, from the deposit institution interest rate, $BInt_{ni}$, of each of the program deposit institutions, $n_i$, e.g., for program deposit institution 130 the client interest rate $CIInt_{ni}$ would be 2.1%, the client interest rate, $CIInt_{ni}$, for program deposit institution 132 would be 1.6%, and the client interest rate, $CIInt_{ni}$, for program deposit institution 134 would be 1.1%.

TABLE VI

| Deposit institution | Client Interest Rate ($CIInt_{ni}$) |
|---|---|
| 130 | 3.0% − 0.9% = 2.1% |
| 132 | 2.5% − 0.9% = 1.6% |
| 134 | 2.0% − 0.9% = 1.1% |

The block 330 calculation of the fee amount in this example with regard to each of the plurality of deposit institutions, $n_i$, e.g., 130, 132, and 134, in the program holding evenly distributed funds of the client account, e.g., a split of $100,000 in each of program deposit institutions 130, 132, and 134, is shown in Table VII for a client A's determined tiered fee rate, $F_i$, of 0.9%. Note that a conversion factor (convert. factor) is included, as 0.9% rate is a yearly rate. Other examples are shown for a client B with a $D_i$ of $6 million (e.g., $2 million per deposit institution) and a client C with a $D_i$ of $12 million (e.g., $4 million per deposit institution), which have determined tiered fee rates, $F_i$, of 0.3% and 0.1% respectively. Note that each of these rates are yearly rates, and must be converted to a rate for that month, e.g., using a division by 365, with the result of this division multiplied by the number of days in the month.

TABLE VII

| | Deposit institution A Fee Amount | Deposit institution B Fee Amount | Deposit institution C Fee Amount |
|---|---|---|---|
| Client A | 0.9% × 100,000.00 = $900/ (convert. factor) | 0.9% × 100,000.00 = $900/ (convert. factor) | 0.9% × 100,000.00 = $900/ (convert. factor) |
| Client B | 0.3% × $2,000,000 = $6000/ (convert. factor) | 0.3% × $2,000,000. = $6000/ (convert. factor) | 0.3% × $2,000,000. = $6000/ (convert. factor) |
| Client C | 0.1% × $4,000,000 = $4,000/ (convert. factor) | 0.1% × $4,000,000 = $4,000/ (convert. factor) | 0.1% × $4,000,000. = $4,000/ (convert. factor) |

The block 340 calculation of the interest amount with regard to the example client account is illustrated by Table VIII for a program deposit institution determined interest rate $CIInt_{ni}$, of 2.1% for program deposit institution 130, a determined client interest rate, $CIInt_{ni}$, of 1.6% for program deposit institution 132, and a program deposit institution determined client interest rate, $CIInt_{ni}$, of 1.1%. Interest rate calculations for client accounts B and C are not shown.

TABLE VIII

| | Deposit institution A Interest Amount | Deposit institution B Interest Amount | Deposit institution C Interest Amount |
|---|---|---|---|
| Client A | 2.1% × 100,000.00 = $2,100/ (convert. factor) | 1.6% × 100,000.00 = $1,600/ (convert. factor) | 1.1% × 100,000.00 = $1,100/ (convert. factor) |

The block 350 calculation comprises the computer-implemented operation of determining the respective total amount of interest for the respective client account for $300,000, e.g., at least summing the interest amounts for each of the one or more aggregated deposit accounts in the program deposit institutions, $n_i$, 130, 132, and 134, holding funds of this client account, i. For this example, the total interest amount comprises $2100/(convert. factor)+$1600/(convert. factor)+$1100/(convert. factor)=Total. Note again that "(convert, factor)" means that a conversion is required from a yearly rate to the rate for the particular month or other period.

One or more of these items of information are used to update the one or more databases.

As noted, in one embodiment, the system may be operated to calculate fee amounts to be applied to accounts in a defined benefit plan. Operations relating to additional computer steps to be performed if a loan is take from the client account, thereby reducing the client fund balance are now described. In this embodiment of the invention used with a defined benefit plan that permits the client to take loans from the client account in the defined benefit plan, the following operations may be performed by one or more computers configured with computer-readable program instructions: (1) obtaining loan transaction data comprising one or more loan amounts for one of the client accounts, i, in the defined benefit plan; (2) reducing the client fund balance for the one client account, i, by the one or more loan amounts in the loan transaction data to obtain a reduced client fund balance for the one client account, i; (3) selecting a fee tier and a corresponding tiered fee rate, F, for the client account, i, based on at least one criterion of whether the reduced client fund balance is within a range set forth in the fee tier; and (4) calculating fees for the one client account, i, based on the reduced client fund balance.

As noted, in one embodiment, the system may be operated to calculate fee amounts to be applied to accounts in a pension benefit plan.

In some situations, market conditions may be such that the fee tier rate, $F_i$, for one or more of the fee tiers may not be competitive, for example a number of basis points being paid for deposits by financial institutions in the marketplace is less then the fees set forth in one or more of the fee tiers, or based on some other competitive criterion. In order to provide ongoing flexibility in the tier rate table, the following computer operations may be performed. A fee market rate for deposits is determined on an on-going basis. Then, determining a fee waiver rate, if any, for one of the fee tiers, based on one or more waiver criteria. For example, one criterion may comprise, for one or more of the tiered fee rates, $F_i$, determining whether a difference between the fee market rate for deposits and the tiered fee rate, $F_i$, in a given fee tier equals or exceeds a threshold amount. If the difference does equal or exceed the threshold amount, then determining a fee waiver rate based on an algorithm. In one embodiment, the fee waiver rate is approximately equal to the calculated difference amount. Then, a discounted tiered fee rate, $F_i$, for one of the fee tiers would be calculated by using an algorithm that includes at least subtracting (or other mathematical operation to obtain the same result) the fee waiver rate from the tiered fee rate, $F_i$, for the one fee tier. Then, the respective client interest rate, $CIInt_{ni}$, for one or more client accounts with client fund balance in a deposit range for the one fee tier, would be determined using the discounted tiered fee rate, $F_i$. The fee amounts would be calculated for the one or more of the client accounts with client fund balances that are in the range for the one fee tier, for each respective aggregated deposit account holding at least an amount of the funds, $A_{ni}$, of the one or more client accounts, using the discounted tiered fee rate, $F_i$.

Alternatively, all deposit institutions would pay the highest rate they are willing to pay, and those rates would fluctuate based on the overall market for deposits. Using all or substantially all of the deposit institutions in the program, the system would determine an average interest rate. This average rate could be a blended rate determined by also taking into account the proportion of deposits of the program held in each of the deposit institutions. For each client account, the system would then deduct from that average interest rate the fee for the tier for that client account. For example, for a client account in a tier A (a fund balance below $100,000), the tier fee would be 2%. For a client account in a tier B (a fund balance between $100,000 and $300,000), the tier fee would be 1.5%. For a client account in a tier C (a fund balance above $300,000), the tier fee would be 1%. These tier fee rates would then be subtracted from the average interest rate determined above, to obtain an interest rate for the client account. All or a portion of the fee may then be waived, in order to be competitive in the marketplace for deposits. The amount of the fee waived may be based on a market rate for fees for obtaining deposits, or may be determined so as to substantially match a current market interest rate for deposits or obtain a percentage of the current market rate for deposits in a given class of deposits.

In a further embodiment, designed to provide fee rate flexibility for market conditions where the fee tier rate, $F_i$, for one or more of the fee tiers is not be competitive, computer-readable instructions are stored in the memory that, when executed, cause the one or more computers to perform the steps: determining a fee market rate for deposits; determining whether a difference between the deposit market rate and the tiered fee rate, $F_i$, in a given fee tier equals or exceeds a threshold amount; and if the difference does equal or exceed the threshold amount, then setting the fee tier rate, Fi, approximately equal to the deposit market rate.

It should be noted that in one embodiment, the transfer data consists only of deposits and withdrawals made on behalf of the respective clients resulting from investment decisions for investments in defined benefit plans. In another embodiment, the transfer data comprises transactions initiated via ACH, wire, credit card, debit card, or check.

In a further embodiment, as noted, instructions are generated for depositing/transferring to, or withdrawing/transferring from, one or more of the aggregated deposit accounts in one or more of the deposit institutions, based at least in part, on the transfer data.

In a further embodiment, instructions are generated for depositing/transferring funds to one selected from the group of money funds, and certificates of deposit, based at least in part, on the transfer data.

In a further embodiment, the client account comprises funds of the client held in the program deposit institutions and also funds of the client held in other program investments vehicles, and the fund balance is the total of funds held in the program aggregated deposit accounts and in other program investment vehicles.

In a further embodiment, the client account consists of funds of the client held only in the aggregated deposit accounts of the program, and the fund balance is a balance of funds of the client held in the program in one or more of the aggregated deposit accounts in the deposit institutions.

In one embodiment, one or more computers may be configured, for example with computer program code loaded in main memory, or via hard-wiring, to implement the allocation across one or more of the program deposit institutions. The amount allocated may be substantially the same across all of the deposit institutions in the program, or may be varied, in some embodiments, based on rules applied for the allocation. Note that different computer-implemented rules may be applied depending on whether the client is a regular individual, a high net worth individual, a corporation, a partnership, a participant in a defined benefit or pension plan, or other entity type, or other variable(s) depending upon the program. For example, the one or more computers may be configured to provide that the amount allocated to a given deposit institution may not exceed a predetermined value based on an account type insurance limit, and/or may not exceed a limit for a given deposit institution determined, for example, by collateral held by the deposit institution or other safety measure or criterion, with the exception of amounts allocated to safety deposit institutions or holdback deposit institutions.

Figure 6:
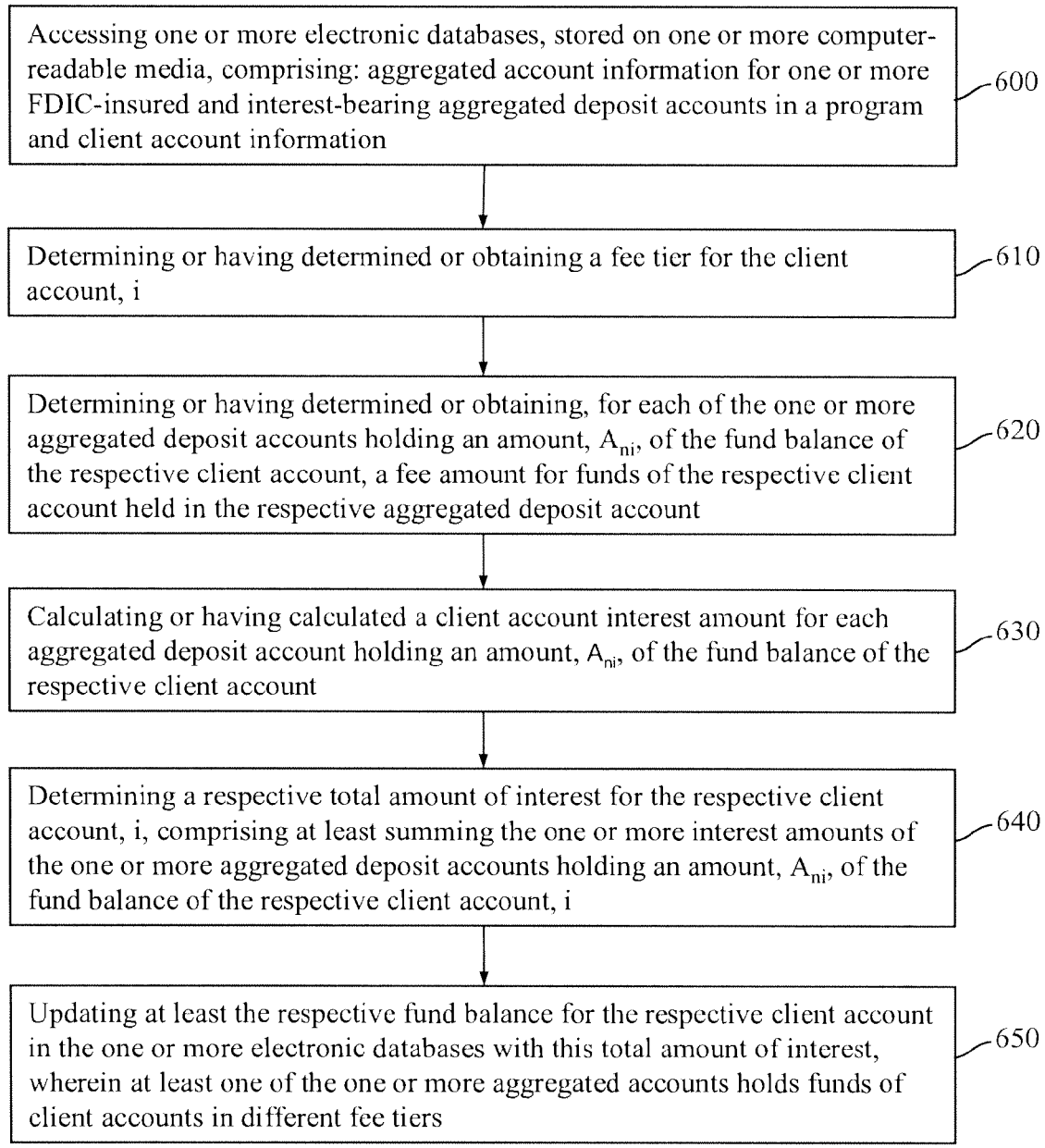
FIG. 6 is schematic block diagram of a further embodiment.

FIG. 6 describes a further method, system and program product embodiment of the invention based on the calculation of client account fees on an aggregated-deposit-account by aggregated-deposit-account basis. Referring to FIG. 6, block 600 comprises the operation of accessing, by one or more computers, one or more electronic databases, stored on one or more computer-readable media, comprising: aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the one or more aggregated deposit accounts held in the one or more deposit institutions in the program, where the client account represents funds of the respective client held in one or more of the aggregated deposit accounts; and client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account.

Block 610 comprises an operation of, for each respective client account, i, of more than one of the client accounts, determining or having determined or obtaining, by the one or more computers, a fee tier for the client account, i, from among a plurality of fee tiers. In one embodiment, the determining or having determined or obtaining a fee tier for the client account, i, is based at least in part on one or more criteria. For example, the determining or having determined or obtaining a fee tier for the client account, i, may comprise determining the fee tier based at least in part on the respective fund balance for the respective client account (or based on other fund balances in the examples set forth previously) in relation to a set of tier client account ranges. This embodiment may further comprise the step of obtaining the respective fund balance for the respective client account in order to determine the fee tier. In a further embodiment of this operation, the fee tier may be obtained by accessing a link to a field in a database for the client account or for the source institution for the client account.

Block 620 comprises an operation of determining or having determined or obtaining, by the one or more computers, for each of the one or more aggregated deposit accounts holding a respective amount, $A_{ni}$, of the fund balance of the respective client account, a fee amount for funds of the respective client account held in the respective aggregated deposit account. In one embodiment, the fee tier has a corresponding tier fee rate, $F_t$ or more complex algorithm. In this embodiment, the fee amount for a respective aggregated deposit account may be obtained by multiplying the amount, $A_{ni}$, of the fund balance of the respective client account by the tier fee rate, $F_t$. In another embodiment, the fee tier has an associated fixed fee. For example, the fixed fee associated with the fee tier may be obtained by accessing a field in a database. In one implementation, the fee tier may have an associated link to a field in a database. This field may set forth a fee amount, which may be fixed, or may vary in accordance with a function based on a market rate of interest or a market fee for deposits or some other parameter, for example.

Block 630 comprises the computer-implemented operation of calculating or having calculated, by the one or more computers, a client account interest amount for each aggregated deposit account holding a respective amount, $A_{ni}$, of the fund balance of the respective client account, wherein the interest amount for the respective aggregated deposit account holding funds of the respective client account is determined based, at least in part, on the amount, $A_{ni}$, of the fund balance of the respective client account held in the respective aggregated deposit account. In a further embodiment, the determination of the client interest for each of the one or more aggregated deposit accounts is based, at least in part, also on the fee amount. For example, the client interest amount could be determined by subtracting the fee amount for this client for this aggregated deposit account from the pro rata share of the client (the amount of funds of the client account in the in this aggregated deposit account) in the interest earned by all funds in this aggregated deposit account. In one embodiment, the calculating or having calculated a client account interest amount for each aggregated deposit account holding a respective amount, $A_{ni}$, of the fund balance of the respective client account is calculated iteratively for each sub-period of the period.

Block 640 comprises an operation of determining, by the one or more computers, a respective total amount of interest for the respective client account, i, comprising at least summing the one or more interest amounts of the one or more aggregated deposit accounts holding a respective amount, $A_{ni}$, of the fund balance of the respective client account, i.

Block 650 comprises an operation of updating, by the one or more computers, the respective fund balance for the respective client account in the one or more electronic databases with this total amount of interest.

Note at least one of the one or more aggregated accounts holds funds of client accounts in different fee tiers.

In one embodiment, there are a plurality of deposit institutions, with each of this plurality holding at least one of the aggregated deposit accounts.

Figure 7:
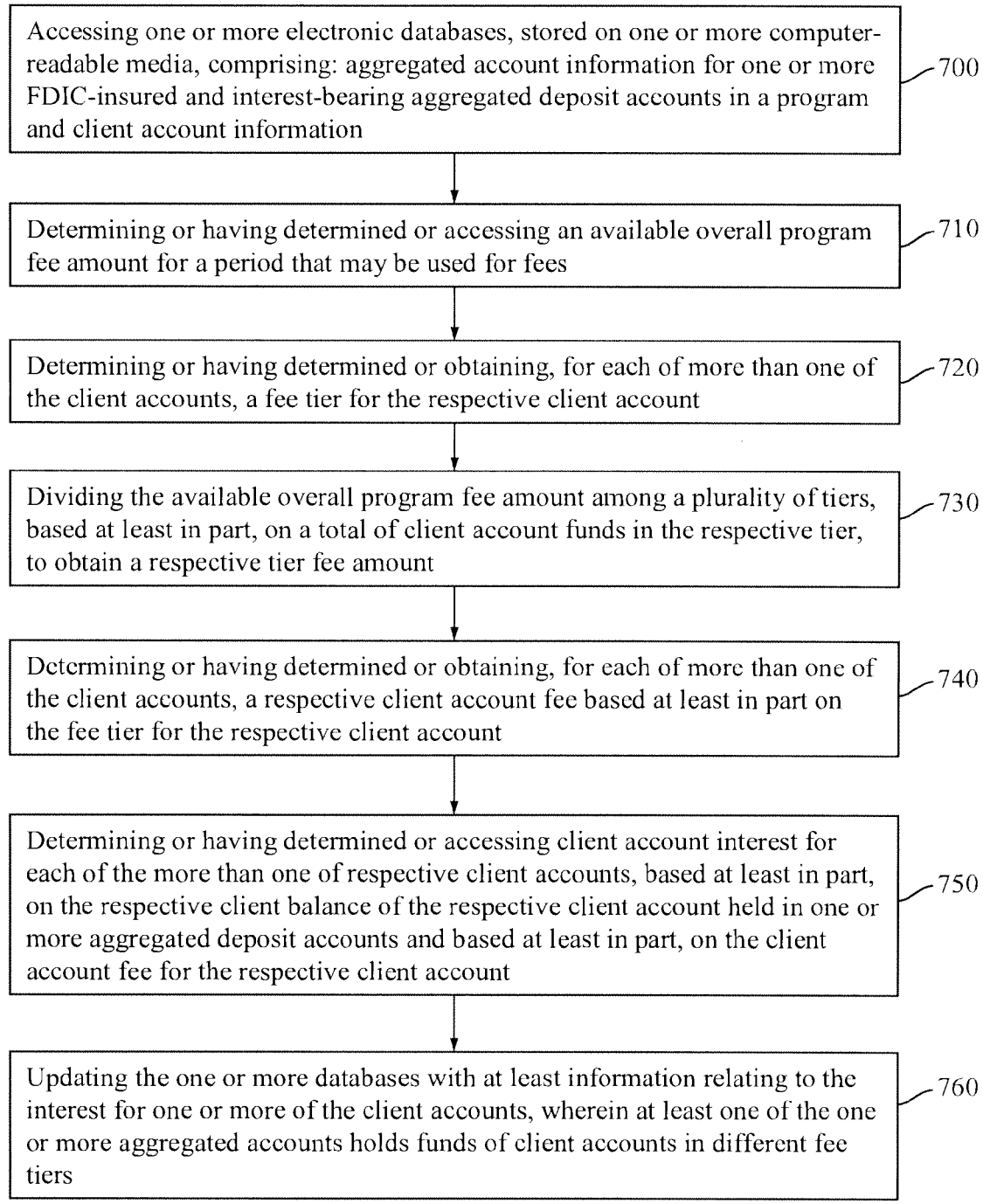
FIG. 7 is schematic block diagram of a further embodiment.

FIG. 7 discloses a method, system and program product for a yet further embodiment of the invention calculating client account fees based on an overall program fee amount available for fees and the fund balance in the client account. Block 700 comprises accessing, by one or more computers, one or more electronic databases, stored on one or more computer-readable media, comprising: aggregated account information for one or more of Federal Deposit Insurance Corporation (FDIC)-insured and interest-bearing aggregated deposit accounts held in one or more deposit institutions in a program, wherein funds from client accounts of a plurality of clients are aggregated with funds of other client accounts in the one or more aggregated deposit accounts held in the one or more deposit institutions in the program, where the client account represents funds of the respective client held in one or more of the one or more aggregated deposit accounts; and client account information for each of more than one of the respective client accounts comprising: (a) a respective fund balance in the respective client account; and (b) a respective amount of the fund balance of the respective client account held in each of the one or more of the aggregated deposit accounts holding funds of the client account.

Block 710 comprises an operation of determining or having determined or accessing, by the one or more computers, an available overall program fee amount for a period that may be used for fees for a plurality of the client accounts. In one embodiment, the overall program fee amount is determined so that the overall program fee amount and a determined interest amount for the client accounts in the program equals a total of interest earned for the period for funds of the client accounts held in the one or more aggregated deposit accounts.

Block 720 comprises an operation of determining or having determined or obtaining, by the one or more computers, for each of more than one of the client accounts, a fee tier for the respective client account. In one embodiment, the determining or having determined or obtaining a fee tier for the client account, i, is based at least in part on one or more criteria. For example, the determining or having determined or obtaining a fee tier for the client account, i, may comprise determining the fee tier based at least in part on the respective fund balance for the respective client account in relation to a set of tier client account ranges. This embodiment may further comprise the step of obtaining the respective fund balance for the respective client account in order to determine the fee tier. In a further embodiment of this operation, the fee tier may be obtained by accessing a link to a field associated with the client account or associated with the source institution for the client account in a database.

Block 730 comprises an operation of dividing or apportioning, by the one or more computers, the available overall program fee amount among a plurality of fee tiers, based at least in part, on a total of client account funds in the respective tier, to obtain a respective tier fee amount for each of the respective tiers. In one embodiment, the dividing the available overall program fee amount among a plurality of tiers comprises determining a pro rata share of funds in that respective tier relative to a total of funds in all of the tiers.

Block 740 comprises an operation of determining or having determined or obtaining, by the one or more computers, for each of more than one of the client accounts, a respective client account fee based at least in part on the fee tier for the respective client account. In one embodiment, the determining or having determined or obtaining a respective client account fee may comprise calculating a pro rata share of the respective fee tier amount for the respective client account in the respective fee tier based on its respective client account balance. In a further embodiment of this operation, each of more than one of the fee tiers has a corresponding tier fee rate, $F_i$, and the determining or having determined or obtaining a respective client account fee operation comprises determining the client account fee based at least in part on the tier fee rate, $F_i$, and the respective fund balance in the respective client account. In a yet further embodiment of this operation, the client account fee may be determined based on a fixed fee associated with the fee tier.

Block 750 comprises an operation of determining or having determined or accessing, by the one or more computers, client account interest for each of the more than one of respective client accounts, based at least in part, on the respective client balance of the respective client account held in one or more aggregated deposit accounts and based at least in part, on the client account fee for the respective client account. In one embodiment, the client interest amount may be determined by performing a mathematical operation so that the client interest amount plus the client fee amount is substantially equal to the pro rata share of the client account in the interest earned by the program.

Block 760 comprises an operation of updating, by the one or more computers, the one or more databases with information relating to the interest for one or more of the client accounts. Note that in this set of operations, at least one of the one or more aggregated accounts holds funds of client accounts in different fee tiers.

In one embodiment of the invention, there are a plurality of deposit institutions, each holding at least one of the aggregated deposit accounts.

Figure 8:
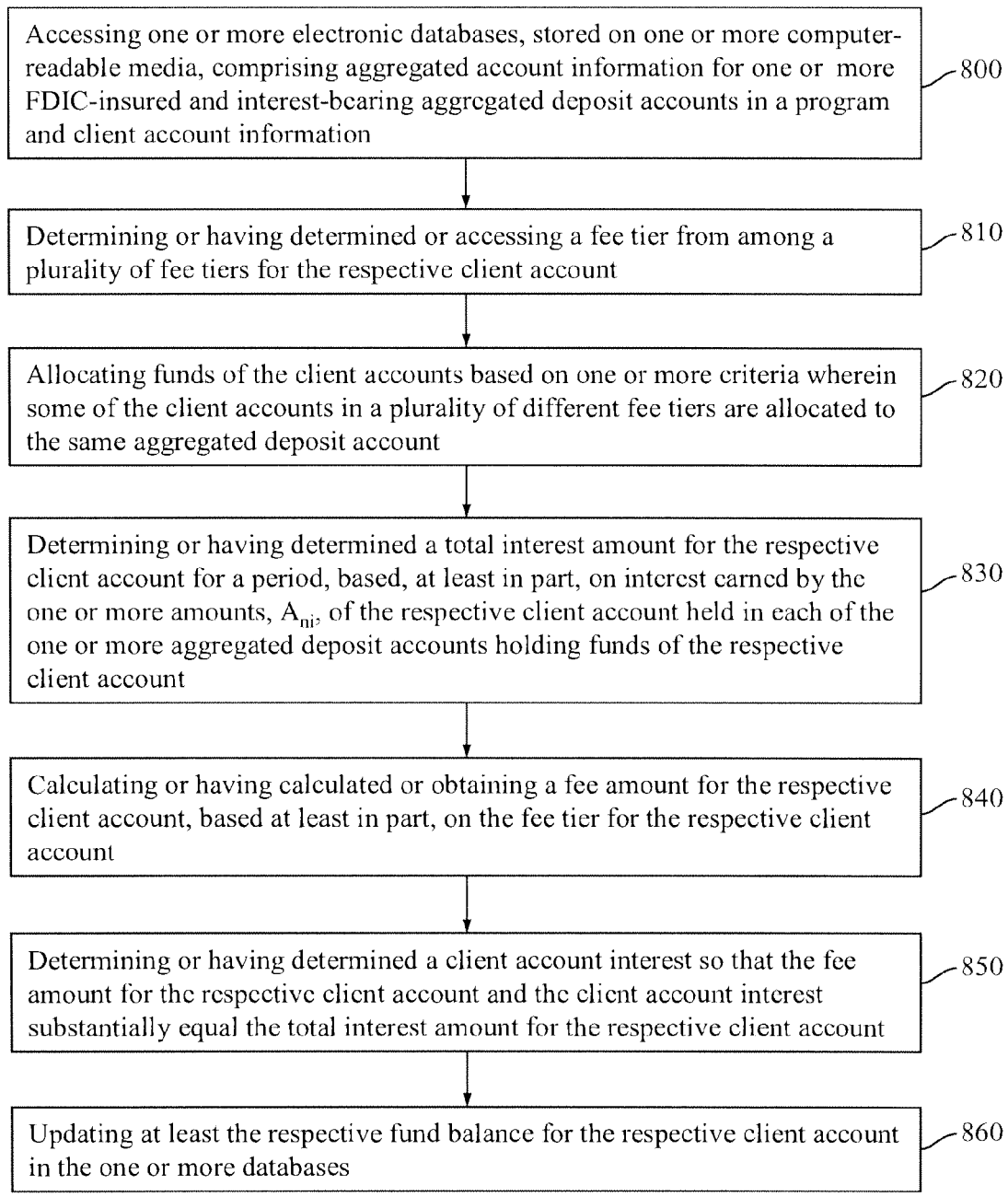
FIG. 8 is schematic block diagram of a further embodiment.

FIG. 8 discloses a method, system and program product for another embodiment of the invention. Block 800 comprises an operation of accessing, by one or more computers, one or more electronic databases, stored on one or more computer-readable media, comprising: aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the aggregated deposit accounts held in the deposit institutions in the program, where the client account represents funds of the respective client held in one or more of the aggregated deposit accounts; and client account information for each of more than one of the respective client accounts comprising: (a) a respective fund balance in the respective client account; and (b) a respective amount, $A_{ni}$, of the fund balance of the respective client account held in each of the one or more of the aggregated deposit accounts holding funds of the client account.

Block 810 comprises an operation of determining or having determined or accessing, by the one or more computers, a fee tier from among a plurality of fee tiers for the respective client account. In one embodiment of this operation, the determining or having determined or obtaining a fee tier for the client account, i, is based at least in part on one or more criteria. For example, the determining or having determined or obtaining a fee tier for the client account, i, may comprise determining the fee tier based at least in part on the respective fund balance for the respective client account in relation to a set of tier client account ranges. This embodiment may further comprise the step of obtaining the respective fund balance for the respective client account in order to determine the fee tier. In a further embodiment of this operation, the fee tier may be obtained by accessing a link to a field for the client account or for the source institution for the client account in a database.

Block 820 comprises an operation of allocating to one or more or all of the aggregated deposit accounts based on one or more criteria, by the one or more computers, funds of the client accounts, wherein some of the client accounts in a plurality of different fee tiers are allocated to the same aggregated deposit account. In one embodiment of this operation, the one or more criteria comprise at least one selected from the group of a respective maximum cap balance(s) or a respective minimum cap balance(s) for the program to be held in respective deposit institution(s), client deposit institution preference or client exclusion information, a bank reciprocity requirement for distributing client funds among banks, and client account insurance limits.

Block 830 comprises an operation of determining or having determined, by the one or more computers, a total interest amount for the respective client account for a period, based, at least in part, on interest earned by the one or more amounts, $A_{ni}$, of the respective client account held in each of the one or more aggregated deposit accounts holding funds of the respective client account. In one embodiment of this operation, the determining or having determined the total client account interest comprises obtaining total earned program interest for the period for program funds held in each aggregated deposit account holding program fund; and determining or having determined a pro rata share of the respective client account of the total earned program interest.

Block 840 comprises an operation of calculating or having calculated or obtaining, by the one or more computers, a fee amount for the respective client account, based at least in part, on the fee tier for the respective client account. In one embodiment, the fee tier has a corresponding tier fee rate, $F_i$. In this embodiment, the fee amount for a respective aggregated deposit account may be obtained by multiplying the fund balance of the respective client account by the tier fee rate, $F_i$. In another embodiment, the fee tier has an associated fixed fee. For example, the fixed fee associated with the fee tier may be obtained by accessing a field in a database. In one implementation, the fee tier may have an associated link to a field in a database. This field may set forth a fee amount, which may be fixed, or may vary in accordance with a function based on a market rate of interest or some other parameter, for example.

Block 850 comprises an operation of determining or having determined, by the one or more computers, a client account interest so that the fee amount for the respective client account and the client account interest substantially equal the total interest amount for the respective client account.

Block 860 comprises an operation of updating, by the one or more computers, the respective fund balance for the respective client account in the one or more databases based at least in part on the client account interest.

In one embodiment, adjustment operations may be performed by determining whether or not to adjust the client account interest based, at least in part, on comparing or having compared the client account interest for the respective client account to a threshold amount; and then adjusting or having adjusted the client account interest based on a result of the comparing operation.

In a variation of this embodiment, adjustment operations may be performed by determining whether or not to adjust the client account fee based, at least in part, on comparing or having compared the client account interest for the respective client account to a threshold amount; and adjusting or having adjusted the client account fee based on a result of the determining operation.

By way of example, the threshold amount referred to in these adjustment operations, may comprise a threshold based, at least in part, on a promised interest rate for the respective client account or based on a market interest rate, to name a few.

The actual adjustment of the interest or the fee may take a variety of different forms. For example, the adjustment may be made by adding or subtracting a respective amount from the interest and/or the fee. Alternatively, the adjustment may be made by multiplying or dividing the interest and/or the fee by a factor. Alternatively, the fee amount may be waived, if the threshold is met.

In a yet further embodiment, there are a plurality of deposit institutions, each holding at least one of the aggregated deposit accounts.

Note that in one embodiment, the administrator selects deposit institutions for holding funds in the program based on one or more pre-set criteria. One of the pre-set criteria may be a sequence of depository institutions comprising a waterfall configuration for selecting banks based, at least in part, on bank capacity for holding funds, where the bank capacity is determined based, at least in part, on one or more criteria. In one embodiment, the administrator has no discretion in selecting depository institutions, beyond the one or more pre-set criteria.

In one embodiment, the methodology used to distribute client account to one or among a plurality of the different deposit institution may be disclosed to the client at the inception of the client-source institution relationship, or thereafter, as the methodology changes.

The present invention may be implemented with a variety of financial products. In one embodiment, it may be implemented to determine fees for defined benefit plans such as pension plans. In such implementations, client accounts in the same fee tier class are charged the same fee rate.

Note that the determined tier fee may be split among a variety of different entities. For example, in one embodiment, an amount of the tier fee may be allocated to the administrator, an amount of the tier fee may be allocated to the recordkeeper if different from the administrator, an amount of the tier fee may be allocated to the source, such as a broker-dealer. Note that amounts of the tier fee allocated to the different entities may vary based on one or more criteria.

Note that in variations of the previously described embodiments, one or more of the aggregated interest-bearing accounts held in the program deposit institutions may not be FDIC insured, and may alternatively, hold an amount of collateral or exhibit other features to justify a determination that the respective deposit institution is safe.

In a further variation that can be applied to modify each of the embodiments herein disclosed, the one or more of the electronic databases include client preference and/or exclusion information comprising a client's one or more preferences and/or one or more exclusions of one or more of the program deposit institutions to hold its funds. The memory for one or more of the computers stores computer-readable instructions that, when executed, cause the one or more computers to perform the step of determining the deposit institutions in the program for allocation of the client fund balance based at least in part, on the client preference and/or exclusion information.

In one embodiment of an account allocation sequence, after respective client purchases and redemptions from their respective client accounts have been processed, the accounts are grouped by taxpayer identification number (TIN) and sorted in some defined manner, e.g., descending order based on total TIN balance (highest to lowest) or sorted based on TIN balance from lowest to highest. The allocation proceeds, client account by client account, to determine which program deposit institutions will receive the client account balance or an amount thereof (comprising the day's opening balance for the account, plus first sweep purchases, minus first sweep redemptions for each account). In one embodiment, one or more of the implementations disclosed in Ser. No. 12/638,544 filed Dec. 15, 2009 and provisional applications 61/181,109 filed May 26, 2009 and Ser. No. 61/246,840 filed Sep. 29, 2009, incorporated by reference, may be used to determine how the amounts of the balance are to be distributed among aggregated deposit accounts in the program deposit institutions. The allocation method distributes the account assets to the program deposit institutions based on the TIN balance and based on the type of allocation business rules set for that client account. Note that the business rules may be attributed to an account directly at the client account level, or to multiple accounts at the broker or office/branch level. Some example business rules comprise:

1. A client account's balance must be allocated to deposit institutions in a specific deposit sequence, e.g., a first amount to program deposit institution 130, a next amount to program deposit institution 132, etc.

2. A client account's roster of available program deposit institutions may vary from that of the overall Program due to client deposit institution exclusions, e.g., the client may opt-out of 1 or more deposit institutions in a category, but not all deposit institutions or more than a set number of the deposit institutions in the program. For example, if there are 10 deposit institutions in a program, the client may not be allowed to opt-out of more than 5 deposit institutions.
3. A requested deposit limit for a given program deposit institution is less than the maximum FDIC insurance limit for the given account type (currently $250,000 for an individual account).
4. Amounts from the client account are to be distributed based on one of the embodiments distribution disclosed in Ser. No. 12/638,544 filed Dec. 15, 2009 and provisional application 61/181,109 filed May, 26, 2009 and Ser. No. 61/246,840 filed Sep. 29, 2009.
5. A maximum cap and/or minimum cap associated with the respective program deposit institution must be satisfied.

In one embodiment of business rule priority, client account specific rules may be used first to direct the client account balance allocation. If the client has opted out of a particular program deposit institution, for example, because the client has funds in that deposit institution via an account with another financial entity, or the client has designated that the first amount is to be deposited in a particular deposit institution, then such client account balance allocation will follow those rules in making the allocation of that client's balance. Then financial entity office/branch level allocation business rules may be followed in allocating multiple client accounts of the given financial entity in an order subject to potential amount limits specified by the applicable rule(s). Thus, the client account balance allocation process first allocates non-zero balance accounts according to client account specific rules, then follows office/branch level business rules in a descending or ascending account balance order. Finally, the client account balance allocation process allocates non-zero balance accounts not subject to any of the above applicable business rules in descending or ascending account balance order. The allocation/reshuffling of client account balances may also follow certain other business rules to minimize the volume of account balance redistributions required to match with the destination program deposit institution amount allocation. Likewise, a rule may be followed that no more than six withdrawals in a particular manner, per (12 CFR 329.1-101), may be made from a given program deposit institution during a period such as a month. Other allocation rules may be set by the individual account holder, the broker dealer or other financial entity, and the management system 100.

As noted, in some embodiments one or more safety deposit institutions may be designated. The "safety deposit institution" receives the deposits for all of the account balances in excess of the insurance limit provided by the program. The safety deposit institution may be generally one of the larger and/or more stable deposit institutions in the program, and so is less likely to experience deposit institution failure, or it may comprise a deposit institution with a certain level of collateral. In one embodiment, the safety deposit institution may be selected at the broker or financial entity level. In another embodiment, it may be selected at the client level. If a broker or system selected deposit institution is opted out for a particular client account, then the deposit institution with the highest available capacity may be used as the safety deposit institution for that account. Note that due to opt-out and other rules, there may be multiple safety deposit institutions. The safety deposit institution for a given client may be selected by rule.

Referring again to FIG. 1, the management system 100 may be configured to allocate and manage deposits, withdrawals and other transactions relating to each of the aggregated accounts in each of the program deposit institutions 130-140. Thus, in one embodiment, the management system 100 itself tracks the net activity for the aggregated deposit accounts maintained by the financial entity or the management system 100, at the program deposit institutions 130-140, based on information generated by it own computers, e.g., wires, messages, to name a few, and/or receives from the financial entities and/or from other appropriate sources this information via contract or otherwise. The management system 100 maintains electronic records or has maintained for it records in one or more electronic databases, on each financial entity and its respective clients with funds in the program deposit institutions managed by the management system 100.

As explained more fully below, the management system 100 may automatically generate reports, for example in the form of e-mail messages, text messages, faxes, postings on prescribed web pages, to name a few, advising the financial entities with the client relationship, of the day's net activity for the aggregated accounts in the multiple program deposit institutions holding funds for clients of that financial entity, and/or activity in one or more client accounts of that financial entity. If more than one aggregated deposit account is maintained at a program deposit institution, 130-140, each aggregated deposit account may be settled separately. The management system 100 maintains or has maintained for it computer software and/or hardware located at a main management system site, or at one or more remote sites that are in network communication with the management system 100, that maintain databases and other program functions to track activities in the various aggregated accounts in each of the program deposit institutions 130-140. Examples of such computer software and/or hardware will be discussed below.

In yet a further embodiment, an audit trail of allocations and reallocations of client account funds at each of the program deposit institutions may be generated. For example, the system may track the allocation among program deposit institutions for a client account. In some embodiments, the system may send information on an intra day movement among program deposit institutions of the funds of individual client accounts and associated financial entities, to the respective individual clients, and/or to the associated financial entity, and/or to any outside party. After the last allocation has run for the day, the process then creates outbound files for the program deposit institutions and the broker dealers or other financial entities maintaining the client relationships. The deposit institution deposit file sent to the financial entity may include each client account for that financial entity with funds in the program, and the respective balance held at each program deposit institution, for that financial entity. A file may also be sent to each program deposit institution, which file includes the client's financial entity account number, a balance for that client account at the program deposit institution and the last four digits of the client's tax TIN. Accordingly, the process in one embodiment, creates a transaction audit trail to record all changes in client account deposit institution balances and an identification of the program deposit institutions holding those funds and the amounts of client account funds held therein. The transactions are written into an insured deposits transaction history table.

In yet a further embodiment, an on-the-fly report of uninsured funds is generated and communicated by some convenient electronic means. The insurance process detects whether an account's assets cannot be insured as the program processes/re-allocates on a per client account basis. In this manner, uninsured client accounts will be written to the uninsured file to capture such client accounts "on the fly." An uninsured account balance report thus may include all uninsured client accounts with a listing of the account current balance and an aggregated TIN balance per program deposit institution. The report may be used by an operations department as an audit tool. The report may be reviewed daily to ensure that all accounts are properly insured. For overall program deposits that exceed a collateral limit or a cap, an excess deposits report may be generated.

The system further includes a message generator that generates one or more electronic messages and/or settlement wires regarding withdrawal of funds from or deposit of funds to each of the aggregated accounts in the program deposit institutions, as well as for the purchase of other financial products. Messages may, for example, be in the form of e-mail, facsimile, text message or other form of communication, and may be sent electronically, or by messenger, for example. Such messages may be sent to the financial entities and/or the deposit institutions for providing notice of an action, or a request for approval of an action, and may include information such as, for example, an amount withdrawn or deposited and the reason for the withdrawal or deposit.

Figure 2:
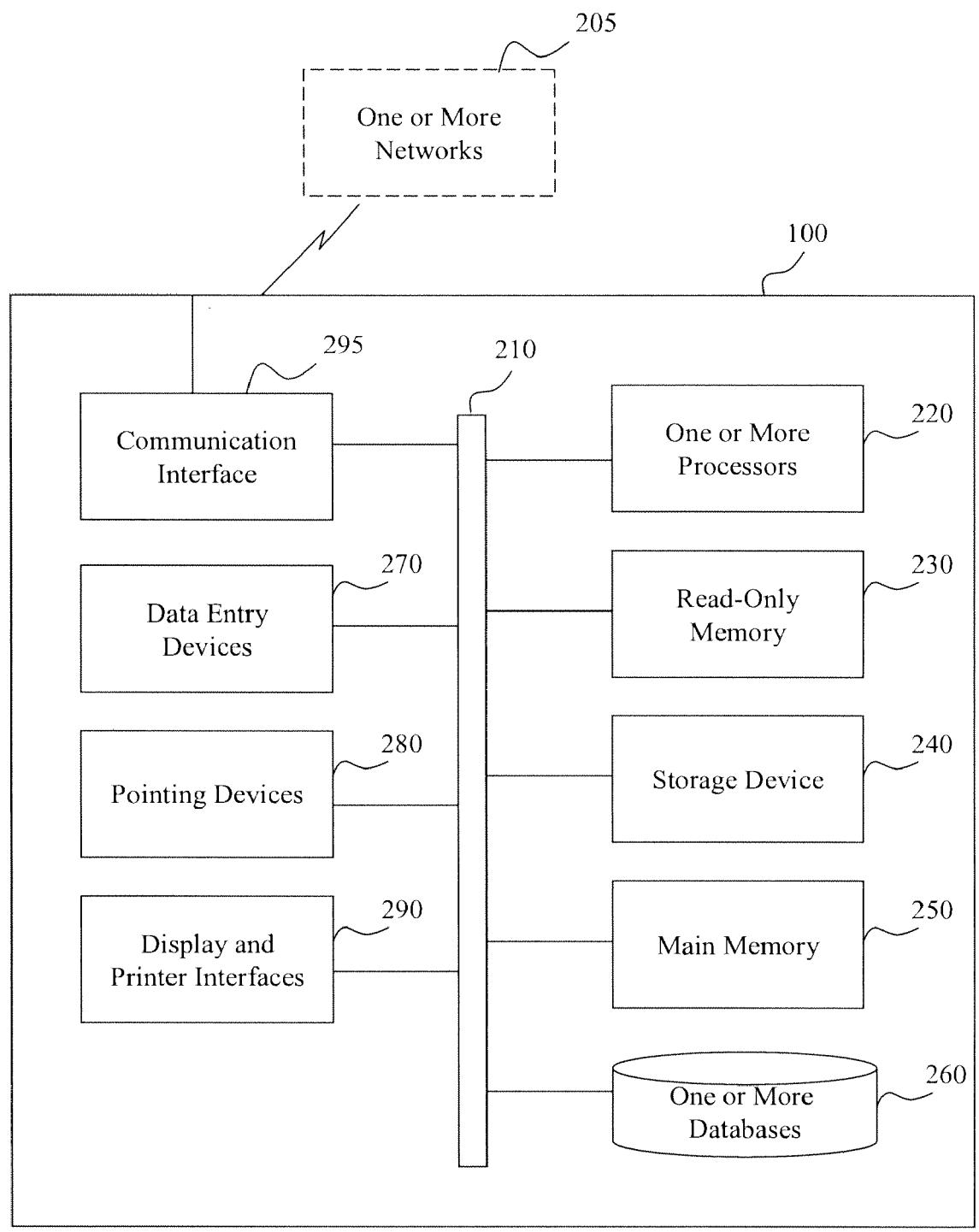
FIG. 2 is a schematic block diagram of an electronic system for implementing one or more of the embodiment of the invention.

FIG. 2 is a block diagram showing an embodiment of an aggregated account management system 100 of FIG. 1, generally designated by reference number 200 in FIG. 2, according to an exemplary embodiment of the present invention. In one embodiment, the aggregated account management system 200 according to the present invention may be communicatively coupled to one or more electronic networks 205 via a communication interface 295. The one or more networks 205 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 295 may be implemented accordingly. The network 205 serves the purpose of delivering information between connected parties.

In one embodiment, the network 205 may comprise the Internet, and the system 200 may communicate therethrough deposit institution and financial entity records to interested or authorized parties. The aggregated account management system 200 may also or alternatively be communicatively coupled to a network 205 comprising a closed network (e.g., an intranet). The communication may comprise deposit institution and financial entity records to a limited number of receivers, potentially with an enhanced level of security. The management system 200 may be configured to communicate, via the one or more networks 205, with respective computer systems of the one or more source financial entities, the program deposit institutions 130-140, and to the one or more control operating accounts in the financial institution or intermediary deposit institution 110. By way of example, such communication may be used to manage the aggregated deposit accounts held at each program deposit institution, to maximize insurance for the money in the various client accounts, and/or to increase the safety of that money, and/or to meet reciprocity goals among deposit institutions.

The management system 200 may comprise, in some embodiments, a computing platform for performing, controlling, and/or initiating computer-implemented operations, for example, via a server and the one or more networks 205. The computer platform may comprise system computers and other party computers. An exemplary management system 200 may operate under the control of computer-executable instructions to carry out the process steps described herein. Computer-executable instructions comprise, for example, instructions and data which cause a general or special purpose computer system or processing device to perform a certain function or group of functions. Computer software for the management system 200 may comprise, in an embodiment, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The management system 200 may include, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The management system 200 may comprise, in one embodiment, a bus 210 or other communication component that couples various system elements 220-295, and is configured to communicate information among the various system elements 220-295.

As shown in FIG. 2, one or more computer processors 220 may be coupled with the bus 210 and configured to process and handle information and execute instructions. The management system 200 may include a main memory 250, such as a Random Access Memory (RAM) or other dynamic storage device, coupled to the bus 200, for storing information and instructions to be executed by the one or more processors 220. The main memory 250 also may be used for storing temporary variables or other intermediate information during execution of instructions by the one or more processors 220.

The management system 200 further may comprise a Read-Only Memory (ROM) 230 or other static storage device (e.g., EPROM, EAROM, EEPROM, PROM, flash, and the like) coupled to the bus 210 for storing static information and instructions for the one or more processors 220. Furthermore, a storage device 240, such as a magnetic disk or optical disk, such as a CD-ROM or other optical media may be provided and coupled to the bus 210 for storing information and instructions.

In addition to the ROM 230, one or more other databases 260 may be coupled to the bus 210 for storing static information and software instructions. Information stored in or maintained in the database 260 may be provided in conformance with a database management system format such as, but not limited to, the Structured Query Language (SQL) format. Database query and access instructions, for example, in the form of one or more scripts, may be used which, when executed by a processor such as the processor 220, serve to access, store and retrieve data maintained in the database 260 according to the instructions contained in the script.

Furthermore, the management system 200 may comprise application software instructions which may implement a user interface for generating interactive pages or display screens by which a user may provide data to and receive information from the management system 200 and the database 260 using a human-machine interface. Interactive pages may include user dialog boxes for accepting user entered information. In particular, the human-machine interface may comprise a Graphical User Interface (GUI) for prompting the user to enter data by providing an interactive dialog box or message box instructing the user to enter particular data, or to select from among a multitude of options provided using a pull-down menu, for example. A user may interact with the management system 200 via the graphical user interface by using a pointing device and/or data entry device. The GUI may place the output of the management system 200 in a format for presentation to a user via the display. In at least one embodiment, the GUI may be implemented as a sequence of Java instructions.

A data entry device 270, including alphanumeric and other keys, or a pointing device such as a mouse or trackball, or a scanner, to name a few, may be coupled to the bus 210 for communicating information and command selections to the processor 220. The data entry device 270 may be coupled to the bus 210 via an interface (not shown), wherein the interface may be, for example, a serial port, an RS-232 port, or the like. In addition, the interface may be a wireless interface and provide connection-less communication via, for example, Bluetooth communication.

The management system 200 may be coupled via the bus 210 to a display or printer 290 for outputting information to a computer user. In addition, a user may use the display (e.g., touch screen) or printer (e.g., scanner) to provide information to the management system 200.

According to at least in embodiment of the present invention, the various program operations as described herein may be performed by the management system 200 in response to the one or more processors 220 executing one or more sequences of computer-readable instructions contained in the main memory 250. Such instructions may be read into the main memory 250 from another computer-readable medium, such as the ROM 230, the storage device 240, or the database 260. Execution of the sequences of instructions contained in the main memory 250 may cause the one or more processors 220 to perform the process steps described herein. It should be appreciated that an embodiment of the management system 200 may perform fewer or additional processes as compared to those described herein. As noted, the one or more processors 220 may be arranged in a multi-processing arrangement. Alternatively, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in providing instructions to the processor 220 for execution. Such a medium may be removable or non-removable and may take many forms, including, but not limited to, non-volatile media and volatile media. Non-volatile media include, for example, optical or magnetic disks, such as the storage device 240. Volatile media include dynamic memory, such as the main memory 250. Common forms of computer-readable media include, for example, floppy disk, flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions. It should be appreciated that the one or more databases 260, the main memory 250, the storage device 240, and the ROM 230 may, in some embodiments, be described as a "computer-readable medium" or a "computer-readable storage medium."

As previously noted, the management system 200 also comprises a communication interface 295 coupled to the bus 210 for providing one-way, two-way or multi-way data communication with the network 205, or directly with other devices. In one embodiment, the communication interface 295 may comprise a modem, a transceiver Integrated Services Digital Network (ISDN) card, a WAN card, an Ethernet interface, or the like, to provide a data communication connection to a corresponding type of communication medium. As another example, the communication interface 295 may comprise a LAN card to provide a data communication connection to a compatible LAN. Wireless links may also be implemented. In such wireless links, communication interface 295 may communicate with a base station communicatively coupled to a network server. In any such implementation, the communication interface 295 sends and receives electrical, electromagnetic, radio, infrared, laser, or optical signals that carry digital data streams representing various types of information. Any combination of the above interfaces may also be implemented.

In one embodiment, the communication interface 295 may be communicatively coupled to a web server configured to generate and output web content that is suitable for display using a web browser at a computing device. In an embodiment, the server may generate and post or transmit requested information through the communication interface 295 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals and financial entity terminals, and program deposit institution terminals, access and process data from various sources, and output computer-executable instructions and data using the network 205. For example, code and data may be communicated to the computers of clients, financial entities, and the program deposit institutions. One such downloaded application may, for example, implement client account fund balance distribution, or reporting, or message generation, as described herein. Interactive pages transmitted and received using the network 205 may conform to necessary protocols.

A web server may be used in one embodiment that may correspond to a secure web application server behind a web server program that a service provider employs to run one or more web based application programs (e.g., an application program to carry out the methods described above) in a secure fashion. Such a secure web application server may be configured to execute one or more web based application programs, responsive to commands and data received from the clients (via a web page supported by the web server), and provide data and results to the clients. The web server and the web application server may be implemented using a single computing platform. Alternatively, it may also be implemented using multiple separate and distributed computing platforms.

FIG. 4 is a block diagram illustrate at least one embodiment of a memory configuration 400 storing programs used in the present system. This memory configuration may be applicable to the one or more databases 260, the main memory 250, the storage device 240, and/or the ROM 230, or a combination thereof. The memory configuration may comprise one memory, or distributed memories. In one embodiment, the memory configuration may comprise a reporting program 410 for generating reports on various aspects of the system operation, including allocation activity that identifies each of the program deposit institutions holding funds of the client account, the amount from the client account deposited in each of these program deposit institutions, and how much insurance is obtained from each of these identified program deposit institutions for the client account. These reports may then be electronically transmitted or otherwise sent to the financial entities, clients, and the program deposit institutions. The memory configuration may further comprise a message generator program 420 for generating messages and instructions to the various deposit institutions to initiate the movement of funds. The memory configuration may further comprise a account balance monitoring program 430 for monitoring the balance in the individual client accounts. The memory configuration may further comprise a deposit/transfer transaction program 440 for processing deposits and transfers received for the individual client accounts. The memory configuration may further comprise a withdrawal/transfer transaction program 450, for processing withdrawal instructions and transfers received for the individual client accounts. The memory configuration may further comprise an allocation program 460 for allocating amounts to the various program deposit institutions as described herein. The memory configuration may further comprise a program deposit institution monitoring program 470, for monitoring the balances maintained in the one or more aggregated accounts held in each of the respective program deposit institutions, and program deposit institution caps and other parameters. In one embodiment, the memory configuration may comprise a server program 480. In another embodiment, the server program is external to the system, and/or may be operated by a third party. Additionally, the memory configuration comprises a fee program 490. In one embodiment, the fee program may include one or more tier tables, and one or more criteria for selecting tiers therein.

These respective application programs include a sequence of programmed instructions which, upon execution, are operable to configure the management system 200 (shown in FIG. 2) to carry out the respective program operations described herein. The application programs may also include sequences of database access instructions, or scripts to effect storage and retrieval of data using the database 250.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that the calculation and determination operations and steps disclosed herein may be performed by one or more computers that perform the functions at one location or at multiple locations. Also, note that a part or all of a given calculation or determination operation or other operation can be performed by one or more computers owned or controlled by different entities, or at different locations that are directly or indirectly interconnected. The method of performance of the operation or step may, but need not be, controlled, but the step may be performed at the direction of and under limitations (e.g., maintenance of confidentiality, time for performance, etc.) if any, imposed by the entity operating the claimed method, system or program product.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and Web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. Additionally, it is understood that the claim term "a plurality" means more than one, and is not restricted to any particular previous reference to "a plurality," unless preceded by the word "the." Note that the term "based on" is to take its ordinary meaning as open-ended, and does not preclude other factors from being taken into consideration.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A computer system, comprising:
   A. one or more electronic databases, stored on one or more computer-readable media, comprising:
      (1) aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the one or more aggregated deposit accounts held in the one or more deposit institutions in the program, where the client account represents funds of the respective client held in one or more of the aggregated deposit accounts, wherein the aggregated account information comprises a respective balance of funds held in each of the one or more aggregated deposit accounts; and
      (2) client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account; and
   B. one or more computers comprising memory wherein the memory stores computer-readable instructions that, when executed, cause the one or more computers to perform the following steps for each respective client account, i, of more than one of said client accounts:
      (1) determining or having determined or obtaining a fee tier for the client account, i, from among a plurality of fee tiers;
      (2) determining or having determined or obtaining, for each of the one or more aggregated deposit accounts holding a respective amount, $A_{ni}$, of the fund balance of the respective client account, a fee amount for funds of the respective client account held in the respective aggregated deposit account based at least in part on the fee tier determined or obtained for the respective client account;
      (3) calculating or having calculated a client account interest amount for each aggregated deposit account holding a respective amount, $A_{ni}$, of the fund balance of the respective client account, wherein the interest amount for the respective aggregated deposit account holding funds of the respective client account is determined based, at least in part, on the amount, $A_{ni}$, of the fund balance of the respective client account held in the respective aggregated deposit account;
      (4) determining a respective total amount of interest for the respective client account, i, comprising at least summing the one or more interest amounts of the one or more aggregated deposit accounts holding a respective amount, $A_{ni}$, of the fund balance of the respective client account, i; and
      (5) updating the respective fund balance for the respective client account in the one or more electronic databases with this total amount of interest,
      wherein at least one of the one or more aggregated accounts holds funds of client accounts in different fee tiers.

2. The system as defined in claim 1, wherein the determining or having determined or obtaining a fee tier for the client account, i, is based at least in part on one or more criteria.

3. The system as defined in claim 1, wherein the fee tier has a corresponding tiered fee rate, $F_i$, or a fixed fee for the client account, i.

4. The system as defined in claim 1,
   wherein the fee tier has a corresponding tiered fee rate, $F_i$, and
   wherein the determining or having determined or obtaining a fee amount for funds of the respective client account held in each of the one or more aggregated deposit accounts holding a respective amount, $A_{ni}$, of the fund balance of the respective client account, is based, at least in part, on the fee tier rate, $F_i$, for the respective client account and the at least the amount, $A_{ni}$, of the fund balance of the respective client account held in the respective aggregated deposit account.

5. The system as defined in claim 4, wherein the calculating or having calculated a client account interest amount for each aggregated deposit account holding a respective amount, $A_{ni}$, of the fund balance of the respective client account is calculated iteratively for each sub-period of the period.

6. The system as defined in claim 5, wherein the calculating or having calculated a client account interest amount for each aggregated deposit account holding a respective amount, $A_{ni}$, of the fund balance of the respective client account, is based, at least in part, on the amount, $A_{ni}$, of the fund balance of the respective client account held in the respective aggregated deposit account and the fee amount for the respective client account for the respective aggregated deposit account.

7. The system as defined in claim 1,
   wherein the determining or having determined or obtaining a fee tier for the client account, i, comprises determining the fee tier based at least in part on the respective fund balance for the respective client account.

8. The system as defined in claim 1, wherein there are a plurality of deposit institutions, each holding at least one of the aggregated deposit account.

9. The system as defined in claim 1, wherein the client account also represents funds in other program investment vehicles.

10. The system as defined in claim 9, wherein the other program investment vehicles are aggregated investment vehicles.

11. A method, comprising:
    (1) accessing, by one or more computers, one or more electronic databases, stored on one or more computer-readable media, comprising:
       aggregated account information for one or more Federal Deposit Insurance Corporation (FDIC)-insured and interest-bearing aggregated deposit accounts held in one or more deposit institutions, in a program, wherein funds from client accounts of a plurality of clients are aggregated with funds of other client accounts in the one or more aggregated deposit accounts held in the one or more deposit institutions in the program, where the client account represents funds of the respective client held in one or more of the aggregated deposit accounts, wherein the aggregated account information comprises a respective balance of funds held in each of the one or more the aggregated deposit accounts; and
       client account information for each of more than one of the respective client accounts comprising: (a) a respective fund balance in the respective client account; (b) a respective amount, $A_{ni}$, of the fund balance of the respective client account held in each of the one or more of the aggregated deposit accounts holding funds of the client account;

(2) for each respective client account, i, of more than one of said client accounts, determining or having determined or obtaining, by the one or more computers, a fee tier for the client account, i, from among a plurality of fee tiers;

(3) determining or having determined or obtaining, by the one or more computers, for each of the one or more aggregated deposit accounts holding a respective amount, $A_{ni}$, of the fund balance of the respective client account, a fee amount for funds of the respective client account held in the respective aggregated deposit account based at least in part on the fee tier determined or obtained for the respective client account;

(4) calculating or having calculated, by the one or more computers, a client account interest amount for each aggregated deposit account holding a respective amount, $A_{ni}$, of the fund balance of the respective client account, wherein the interest amount for the respective aggregated deposit account holding funds of the respective client account is determined based, at least in part, on the amount, $A_{ni}$, of the fund balance of the respective client account held in the respective aggregated deposit account;

(5) determining, by the one or more computers, a respective total amount of interest for the respective client account, i, comprising at least summing the one or more interest amounts of the one or more aggregated deposit accounts holding a respective amount, $A_{ni}$, of the fund balance of the respective client account, i; and (6) updating, by the one or more computers, the respective fund balance for the respective client account in the one or more electronic databases with this total amount of interest, wherein at least one of the one or more aggregated accounts holds funds of client accounts in different fee tiers.

* * * * *